United States Patent
Cho et al.

(10) Patent No.: US 12,435,117 B2
(45) Date of Patent: Oct. 7, 2025

(54) METHOD FOR PRODUCING IMMUNE CELLS AND USE THEREOF

(71) Applicant: KOREA RESEARCH INSTITUTE OF BIOSCIENCE AND BIOTECHNOLOGY, Daejeon (KR)

(72) Inventors: Yee Sook Cho, Daejeon (KR); Han-Seop Kim, Daejeon (KR); Jae Yun Kim, Daejeon (KR); Binna Seol, Daejeon (KR)

(73) Assignee: KOREA RESEARCH INSTITUTE OF BIOSCIENCE AND BIOTECHNOLOGY, Daejeon (KR)

( * ) Notice: Subject to any disclaimer, the term of this patent is extended or adjusted under 35 U.S.C. 154(b) by 976 days.

(21) Appl. No.: 17/598,917

(22) PCT Filed: Mar. 27, 2020

(86) PCT No.: PCT/KR2020/004198
§ 371 (c)(1),
(2) Date: Sep. 28, 2021

(87) PCT Pub. No.: WO2020/197319
PCT Pub. Date: Oct. 1, 2020

(65) Prior Publication Data
US 2022/0160769 A1  May 26, 2022

(30) Foreign Application Priority Data
Mar. 28, 2019  (KR) ......... 10-2019-0036264
Mar. 28, 2019  (KR) ......... 10-2019-0036265

(51) Int. Cl.
*A61K 35/17* (2025.01)
*A61K 40/15* (2025.01)
*A61K 40/31* (2025.01)
*A61K 40/42* (2025.01)
*A61P 35/00* (2006.01)
(Continued)

(52) U.S. Cl.
CPC .......... *C07K 14/7051* (2013.01); *A61K 40/15* (2025.01); *A61K 40/31* (2025.01); *A61K 40/4205* (2025.01); *A61K 40/4211* (2025.01); *A61K 40/4255* (2025.01); *A61P 35/00* (2018.01); *C07K 14/43504* (2013.01); *C07K 14/4748* (2013.01); *C07K 14/70503* (2013.01); *C07K 14/70517* (2013.01); *C07K 14/70521* (2013.01); *C07K 16/2809* (2013.01); *C07K 16/30* (2013.01); *C12N 5/0646* (2013.01); *C12N 15/86* (2013.01); *A61K 38/00* (2013.01); *A61K 2239/28* (2023.05); *A61K 2239/38* (2023.05); *A61K 2239/54* (2023.05); *C12N 2501/125* (2013.01); *C12N 2501/2302* (2013.01); *C12N 2501/2303* (2013.01); *C12N 2501/2306* (2013.01); *C12N 2501/2307* (2013.01); *C12N 2501/2312* (2013.01); *C12N 2501/2315* (2013.01); *C12N 2501/2318* (2013.01); *C12N 2501/2321* (2013.01); *C12N 2501/26* (2013.01); *C12N 2501/60* (2013.01); *C12N 2501/602* (2013.01); *C12N 2501/603* (2013.01); *C12N 2501/604* (2013.01); *C12N 2501/606* (2013.01); *C12N 2501/727* (2013.01)

(58) Field of Classification Search
None
See application file for complete search history.

(56) References Cited

FOREIGN PATENT DOCUMENTS

| JP | 2017-513498 A | 6/2017 |
|---|---|---|
| JP | 2018-528786 A | 10/2018 |

(Continued)

OTHER PUBLICATIONS

Dopfer EP, Hartl FA, Oberg HH, et al. The CD3 conformational change in the γδ T cell receptor is not triggered by antigens but can be enforced to enhance tumor killing. Cell Rep. 2014;7(5):1704-1715. doi:10.1016/j.celrep.2014.04.049 (Year: 2014).*

(Continued)

*Primary Examiner* — Tracy Vivlemore
*Assistant Examiner* — Fatimah Khalaf Matalkah
(74) *Attorney, Agent, or Firm* — Sughrue Mion, PLLC

(57) ABSTRACT

The present invention relates to: a method for producing immunocytes, specifically induced natural killer T (iNKT) cells that are induced by direct reprogramming of isolated somatic cells, and chimeric antigen receptor (CAR)-iNKT cells into which a CAR gene encoding a CAR is introduced; iNKT cells produced by the method; and a cell therapy composition and a pharmaceutical composition for preventing or treating cancer, comprising the iNKT cells.

The method according to the present invention can produce, through direct reprogramming, iNKT cells or iNKT cells into which a CAR gene is introduced, from isolated cells so as to simplify the production process and shorten production time, thereby reducing costs, to have excellent NKT cell production efficiency, and to ensure safety according to the production without passing through induced pluripotent stem cells, thereby having an excellent NKT cell production effect distinguished from that of a conventional reprogramming technique. In addition, the iNKT cells or iNKT cells into which a CAR gene is introduced, which are produced by the method, have an excellent cancer cell killing ability, and thus can be effectively used as a cell therapy composition or a pharmaceutical composition for preventing or treating cancer.

12 Claims, 13 Drawing Sheets
Specification includes a Sequence Listing.

(51) Int. Cl.
*C07K 14/435* (2006.01)
*C07K 14/47* (2006.01)
*C07K 14/705* (2006.01)
*C07K 14/725* (2006.01)
*C07K 16/28* (2006.01)
*C07K 16/30* (2006.01)
*C12N 5/0783* (2010.01)
*C12N 15/86* (2006.01)
*A61K 38/00* (2006.01)

(56) References Cited

FOREIGN PATENT DOCUMENTS

| | | | | |
|---|---|---|---|---|
| KR | 10-2015-0087727 A | 7/2015 | | |
| KR | 10-2018-0063333 A | 6/2018 | | |
| WO | WO-2012031744 A1 | * 3/2012 | ......... | C07K 14/7051 |
| WO | WO 2017/222593 A1 | 12/2017 | | |
| WO | WO 2018/195175 A1 | 10/2018 | | |
| WO | WO-2018217567 A1 | * 11/2018 | ........... | A61K 31/015 |
| WO | WO 2019/059713 A2 | 3/2019 | | |

OTHER PUBLICATIONS

Japanese Office Action issued on Nov. 1, 2022, in counterpart Japanese Patent Application No. 2021-557872 (5 Pages in Japanese).

Extended European Search Report Issued on May 11, 2023, in Counterpart European Patent Application No. 20777770.7 (7 Pages in English).

Angelos, Mathew G., et al., "Aryl hydrocarbon receptor inhibition promotes hematolymphoid development from human pluripotent stem cells." *Blood, The Journal of the American Society of Hematology*, 129.26, 2017 (pp. 3428-3439).

Li, Ye, et al., "Human iPSC-derived natural killer cells engineered with chimeric antigen receptors enhance anti-tumor activity." *Cell stem cell*, 23, 2, 2018 (pp. 181-192).

International Search Report issued on Jun. 29, 2020 in counterpart International Patent Application No. PCT/KR2020/004198 (2 pages in English and 2 pages in Korean).

* cited by examiner

[Fig. 1]
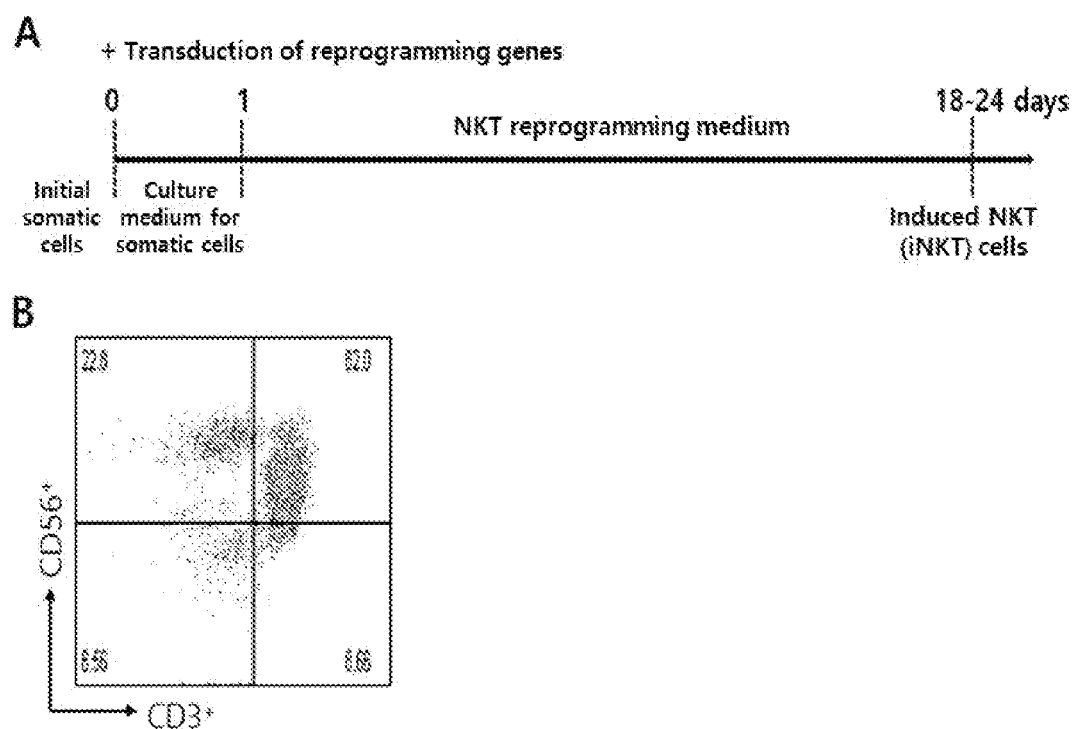

[Fig. 2]
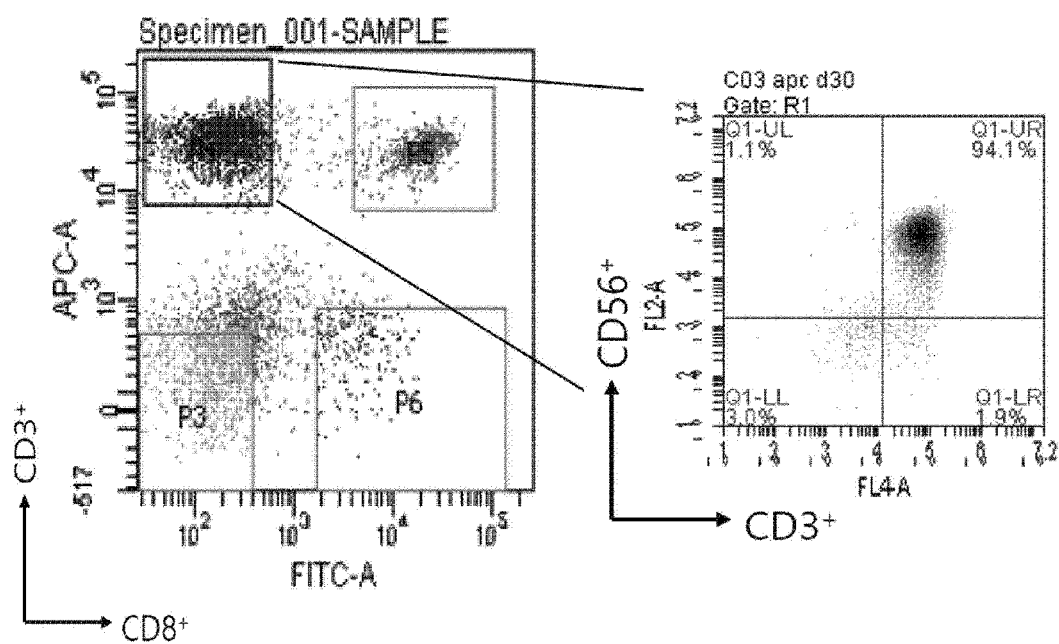

[Fig. 3]
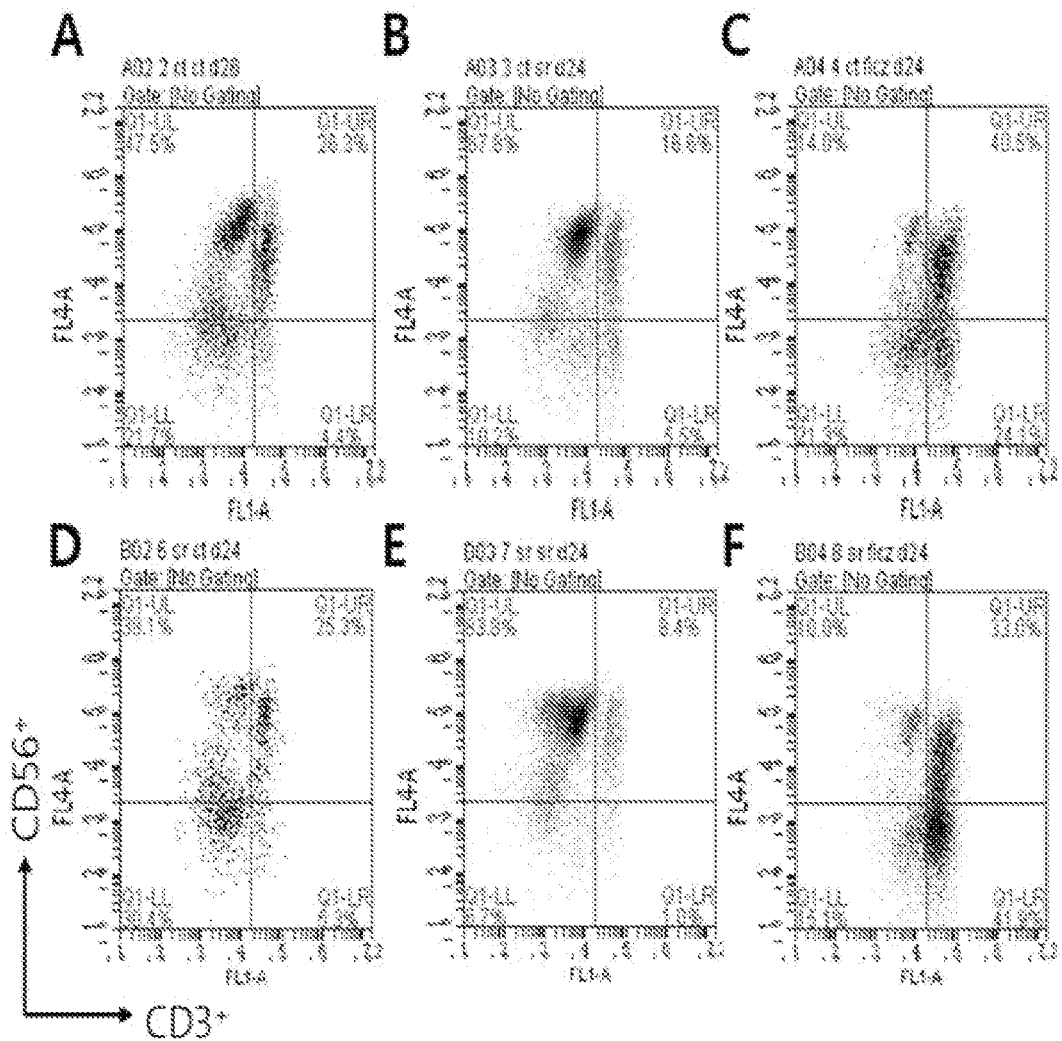

[Fig. 4]
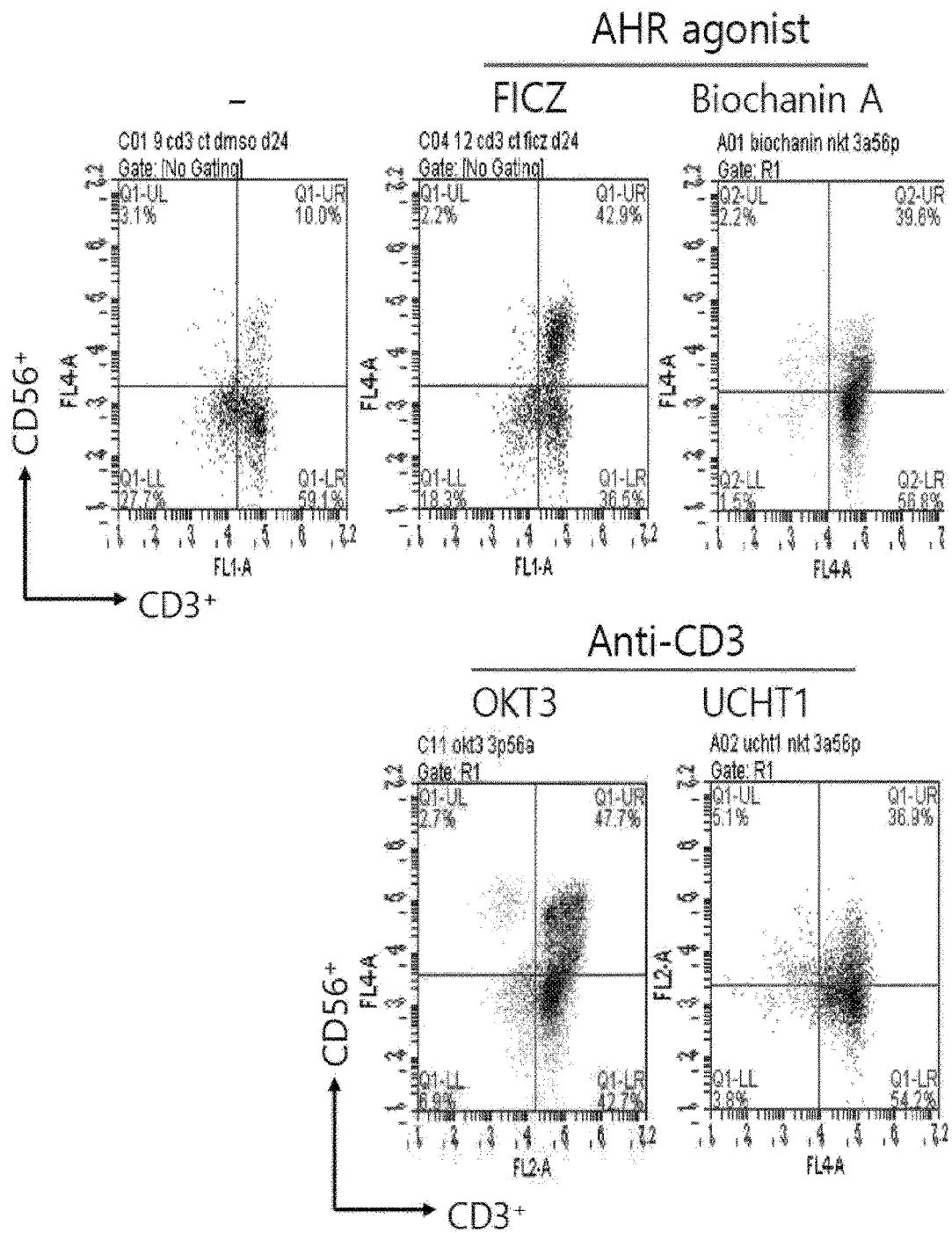

[Fig. 5]
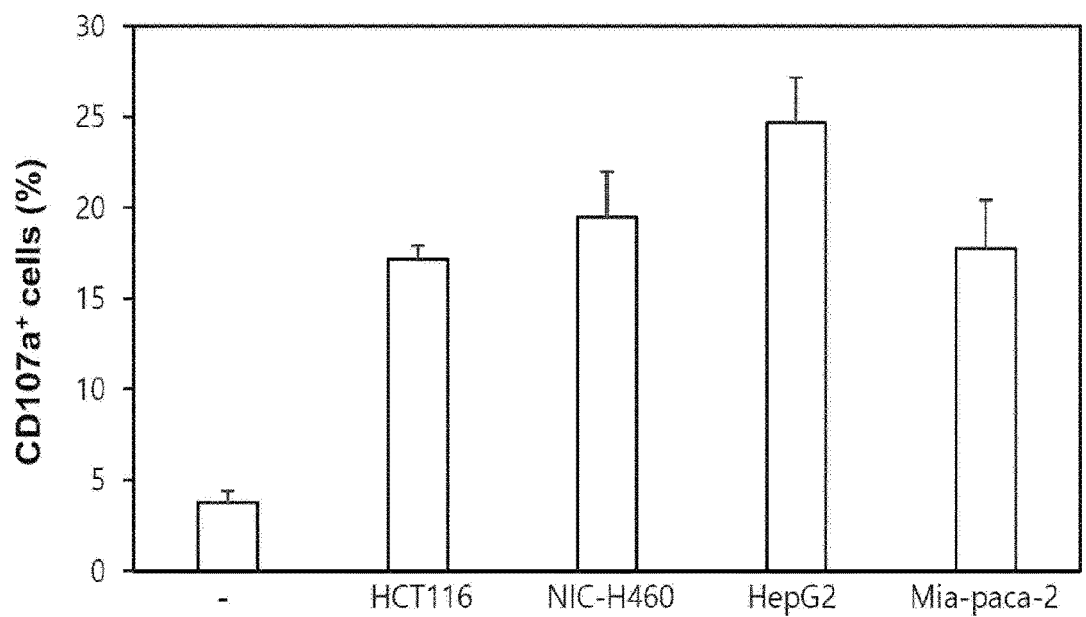

[Fig. 6]
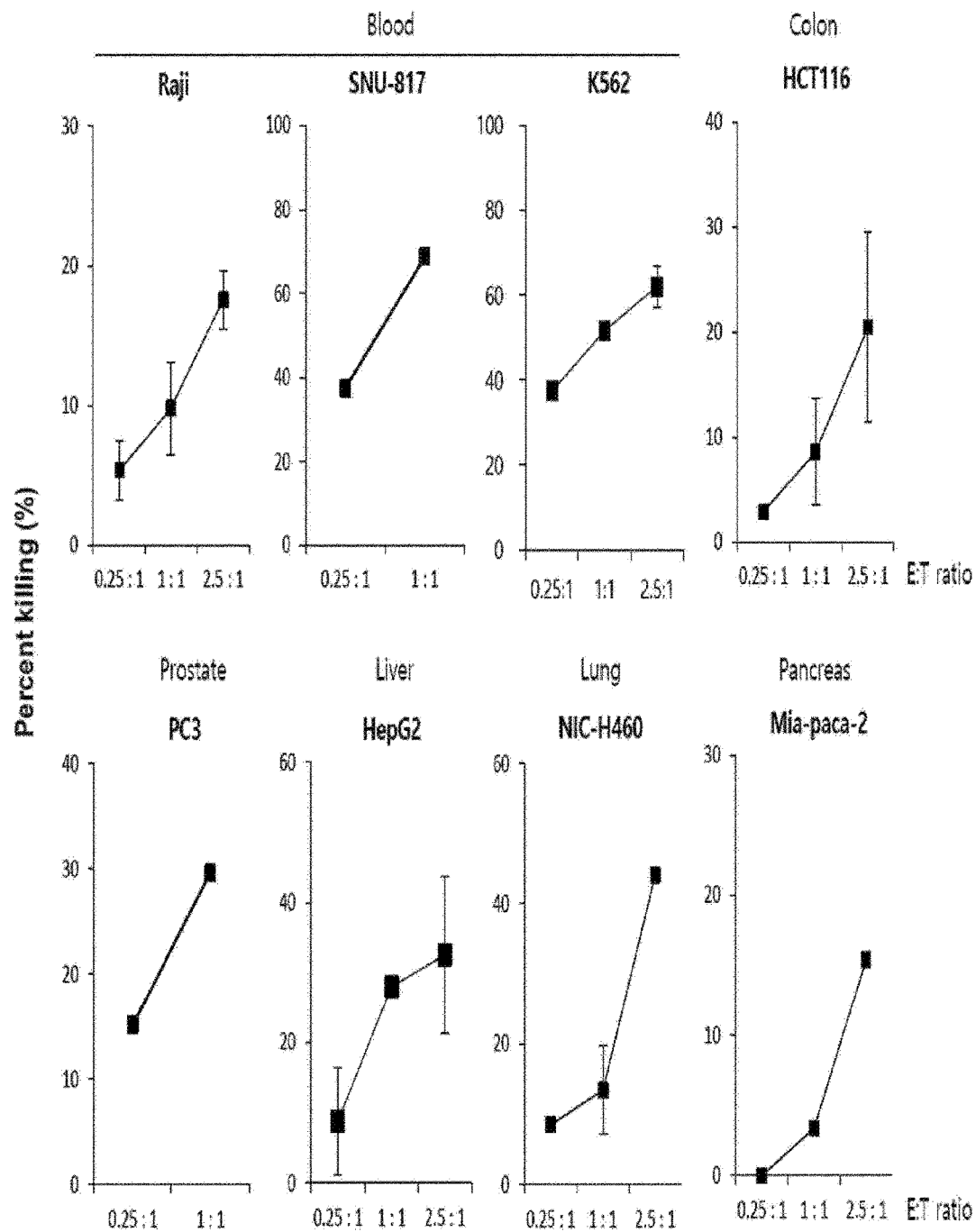

[Fig. 7]
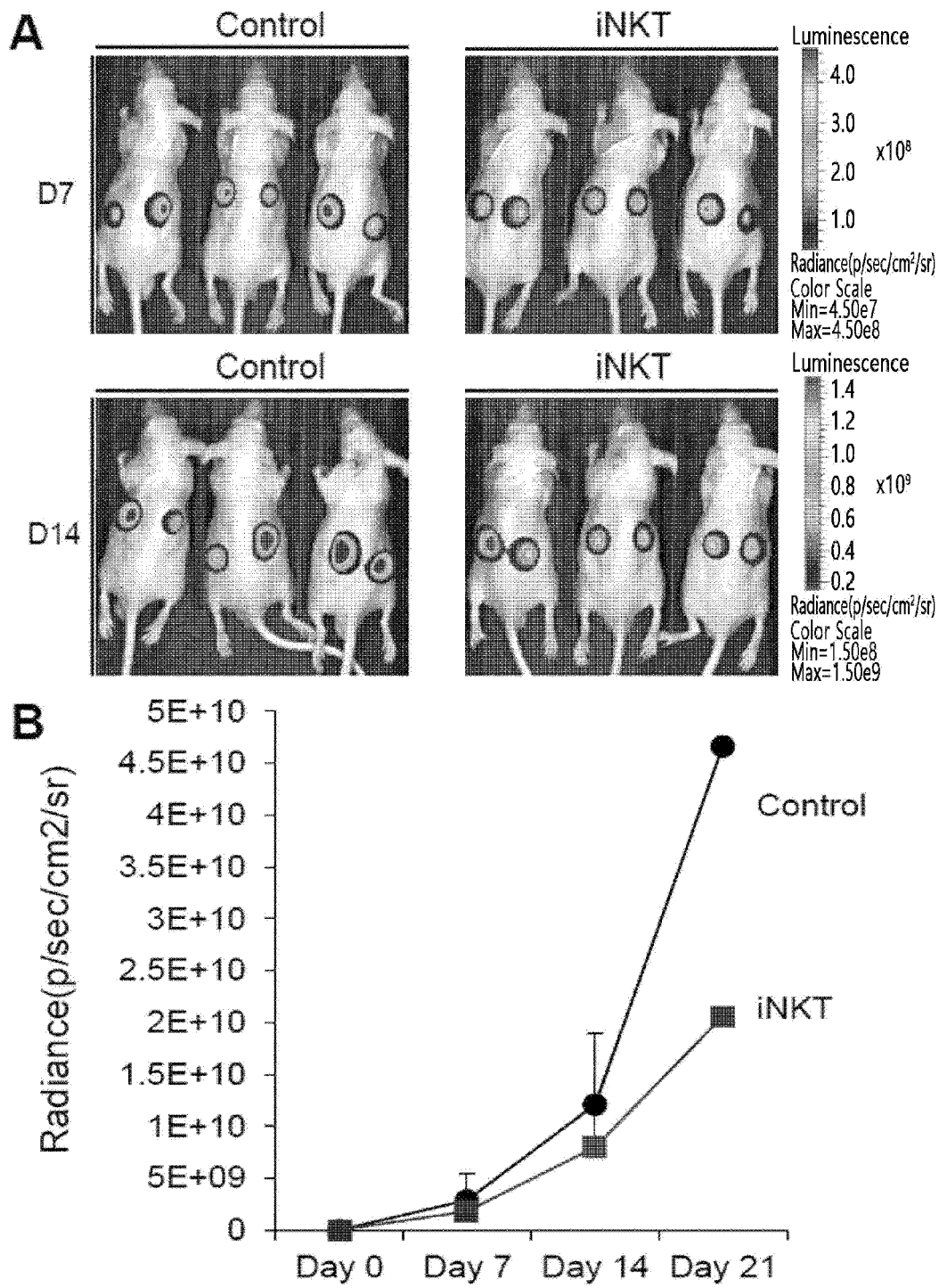

[Fig. 8]
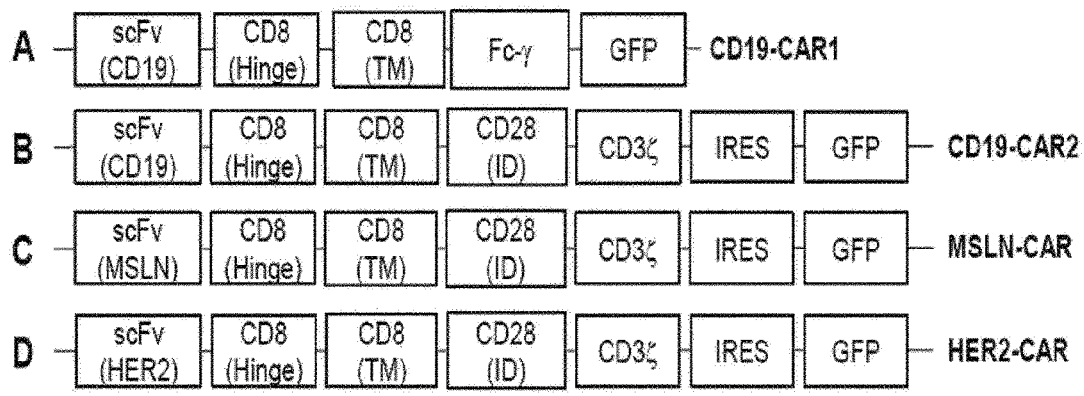
[Fig. 9]
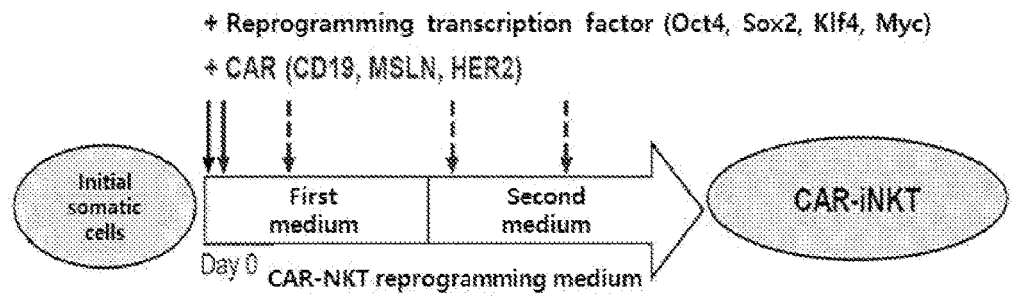

[Fig. 10]
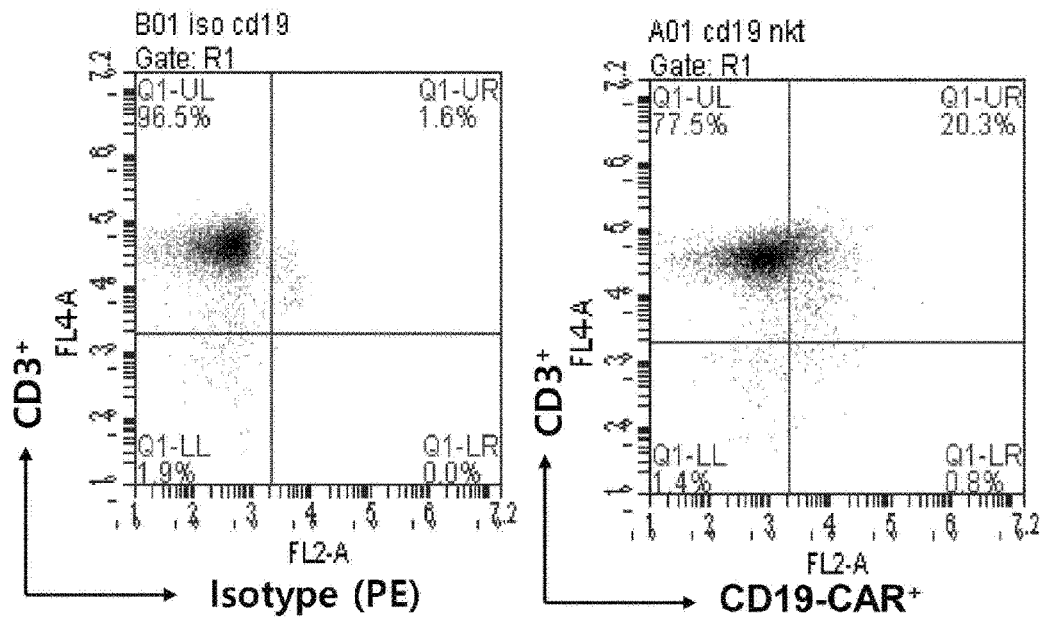
[Fig. 11]
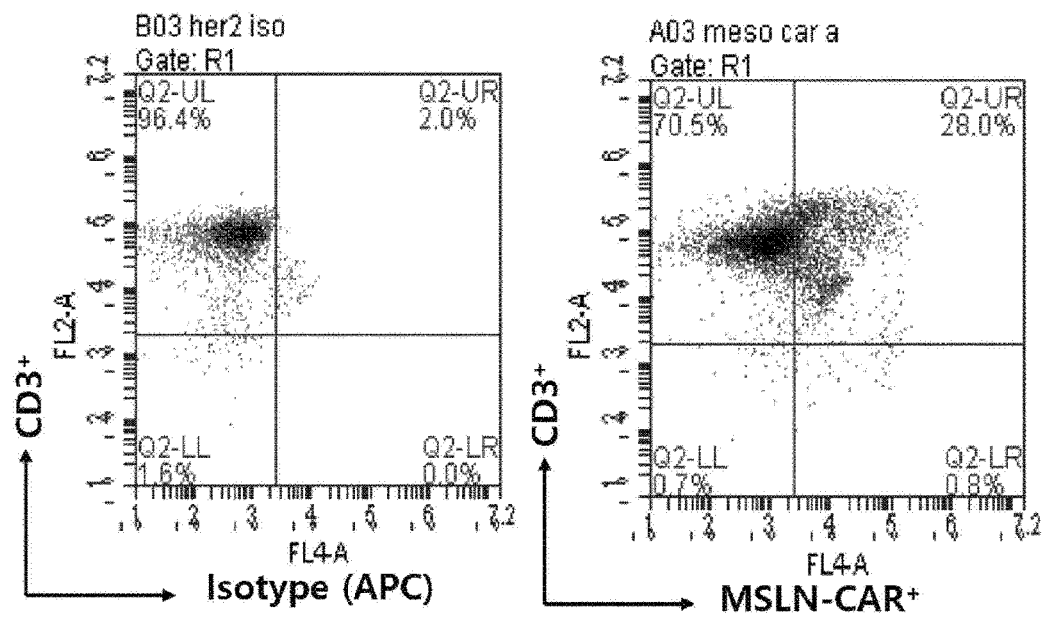

[Fig. 12]
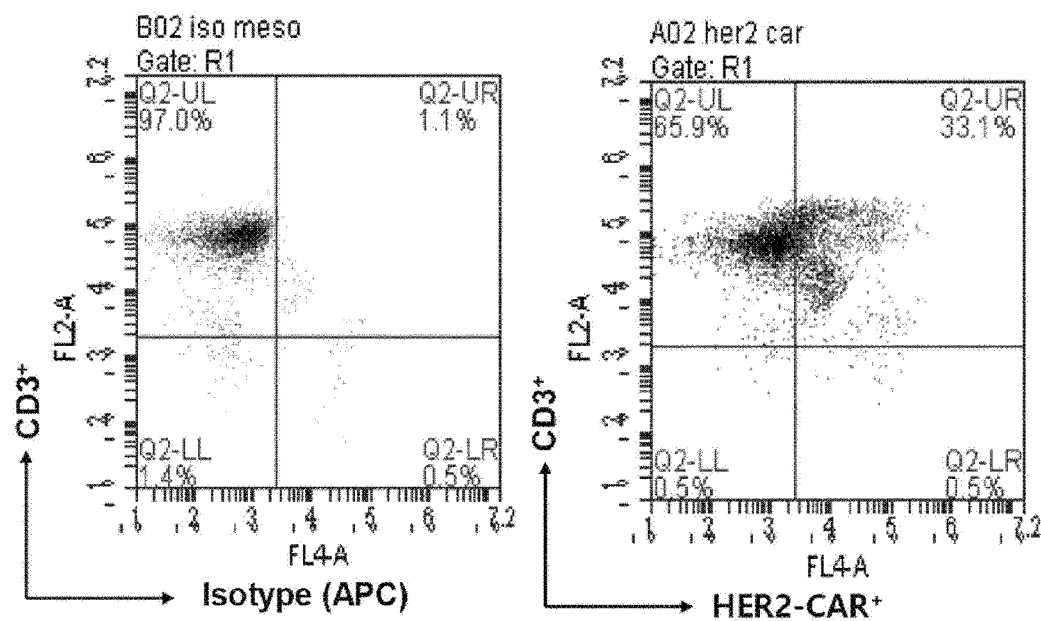

[Fig. 13]
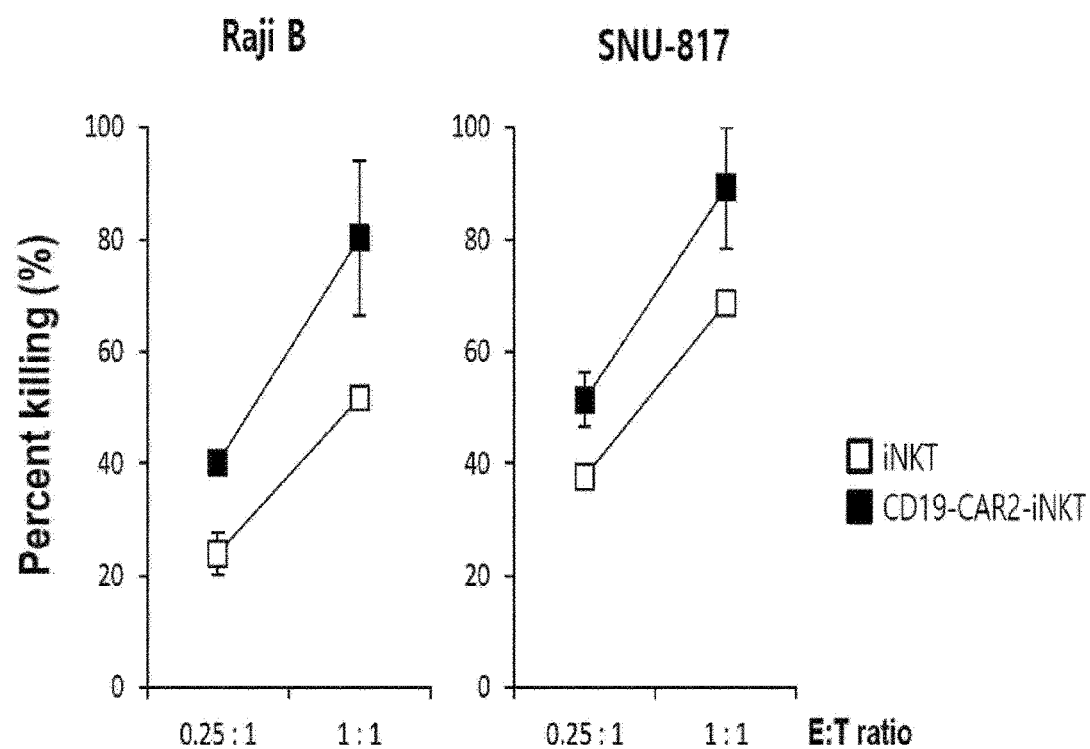

[Fig. 14]
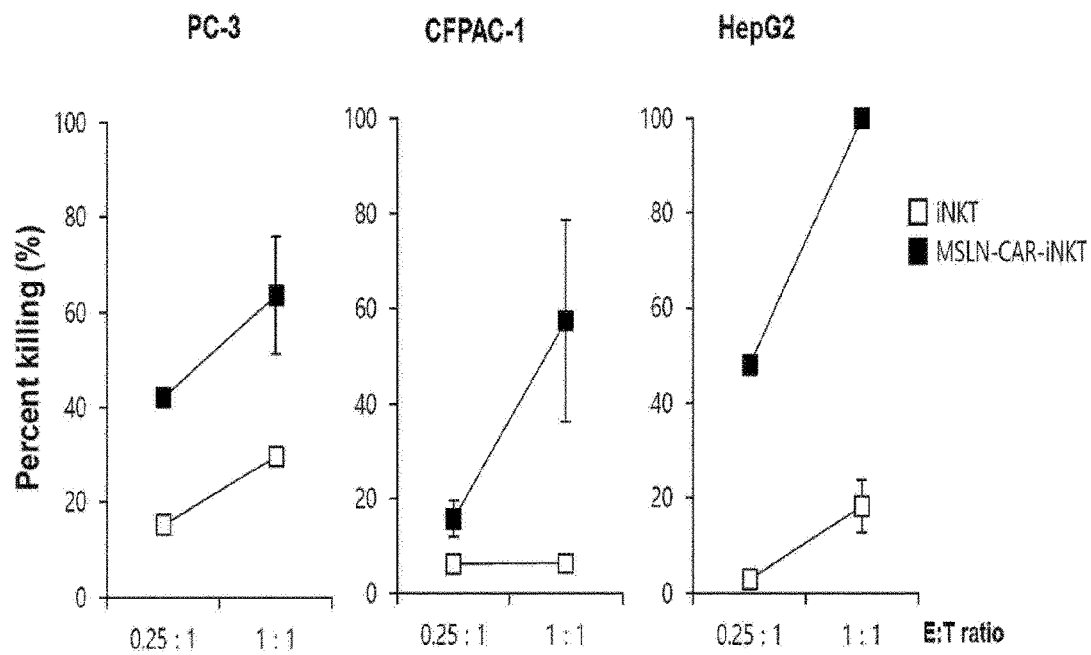

[Fig. 15]
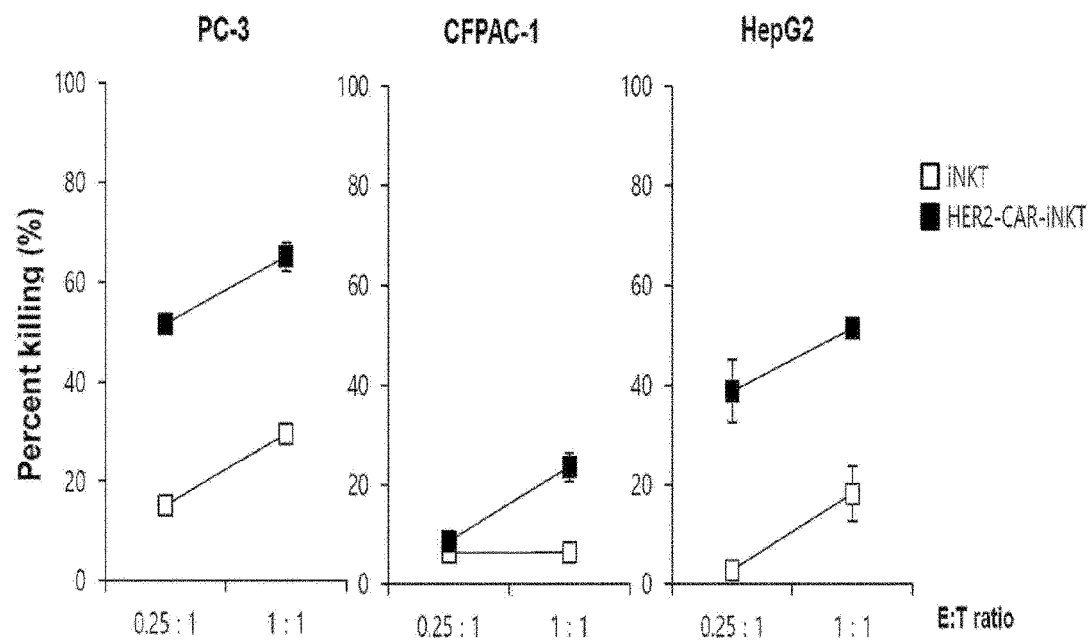

SEQUENCE LISTING

```
<160> NUMBER OF SEQ ID NOS: 11

<210> SEQ ID NO 1
<211> LENGTH: 63
<212> TYPE: DNA
<213> ORGANISM: Artificial Sequence
<220> FEATURE:
<223> OTHER INFORMATION: CD8 leader

<400> SEQUENCE: 1 atggcttac cagtgaccgc cttgctcctg ccgctggcct tgctgctcca cgccgccagg      60
ccg                                                                  63

<210> SEQ ID NO 2
<211> LENGTH: 789
<212> TYPE: DNA
<213> ORGANISM: Artificial Sequence
<220> FEATURE:
<223> OTHER INFORMATION: CD19 scFv

<400> SEQUENCE: 2 atggcttac cagtgaccgc cttgctcctg ccgctggcct tgctgctcca cgccgccagg      60
ccggacatcc agatgacaca gactacatcc tccctgtctg cctctctggg agacagagtc    120
accatcagtt gcagggcaag tcaggacatt agtaaatatt taaattggta tcagcagaaa    180
ccagatggaa ctgttaaact cctgatctac catacatcaa gattacactc aggagtccca    240
tcaaggttca gtggcagtgg gtctggaaca gattattctc tcaccattag caacctggag    300
caagaagata ttgccactta cttttgccaa cagggtaata cgcttccgta cacgttcgga    360
ggggggacca agctggagat cacaggtggc ggtggctcgg gcggtggtgg gtcgggtggc    420
ggcggatctg aggtgaaact gcaggagtca ggacctggcc tggtggcgcc ctcacagagc    480
ctgtccgtca catgcactgt ctcaggggtc tcattacccg actatggtgt aagctggatt    540
cgccagcctc cacgaaaggg tctggagtgg ctgggagtaa tatggggtag tgaaaccaca    600
```

```
tactataatt cagctctcaa atccagactg accatcatca aggacaactc caagagccaa      660
gttttcttaa aaatgaacag tctgcaaact gatgacacag ccatttacta ctgtgccaaa      720
cattattact acggtggtag ctatgctatg gactactggg gccaaggaac ctcagtcacc      780
gtctcctca                                                              789

<210> SEQ ID NO 3
<211> LENGTH: 723
<212> TYPE: DNA
<213> ORGANISM: Artificial Sequence
<220> FEATURE:
<223> OTHER INFORMATION: Mesothelin scFv

<400> SEQUENCE: 3
caagtccaac tcgttcaatc aggcgcagaa gtcgaaaagc ccggagcatc agtcaaagtc       60
tcttgcaagg cttccggcta caccttcacg gactactaca tgcactgggt gcgccaggct      120
ccaggccagg gactggagtg gatgggatgg atcaacccga attccggggg aactaactac      180
gcccagaagt ttcagggccg ggtgactatg actcgcgata cctcgatctc gactgcgtac      240
atggagctca gccgcctccg gtcggacgat accgccgtgt actattgtgc gtcgggatgg      300
gacttcgact actgggggca gggcactctg gtcactgtgt caagcggagg aggtggatca      360
ggtggaggtg gaagcggggg aggaggttcc ggcggcggag gatcagatat cgtgatgacg      420
caatcgcctt cctcgttgtc cgcatccgtg ggagacaggg tgaccattac ttgcagagcg      480
tcccagtcca ttcggtacta cctgtcgtgg taccagcaga agccggggaa agccccaaaa      540
ctgcttatct atactgcctc gatcctccaa acggcgtgc catcaagatt cagcggttcg      600
ggcagcggga ccgactttac cctgactatc agcagcctgc agccggaaga tttcgccacg      660
tactactgcc tgcaaaccta caccaccccg gacttcggac tggaaccaa ggtggagatc       720 aag                                                                    723

<210> SEQ ID NO 4
<211> LENGTH: 723
<212> TYPE: DNA
<213> ORGANISM: Artificial Sequence
<220> FEATURE:
<223> OTHER INFORMATION: HER2 scFv

<400> SEQUENCE: 4
caggtgcagc tgcagcagag cggccctgag ctgaagaagc ccggcgagac agtcaagatc       60
agctgcaagg ccagcggcta ccccttcacc aactacggca tgaactgggt gaaacaggcc      120
ccaggccagg gactgaagtg gatgggctgg atcaacacca gcaccggcga gagcaccttc      180
gccgacgact tcaagggcag attcgacttc agcctggaaa ccagcgccaa caccgcctac      240
ctgcagatca acaacctgaa gagcgaggac agcgccacct actttttgcgc cagatgggag      300 gtgtaccacg gctacgtgcc ctactggggc cagggcacca ccgtgaccgt gtccagcggc      360
ggagggggct ctggcggcgg aggatctggg ggaggggca gcgacatcca gctgacccag      420
agccacaagt ttctgagcac cagcgtgggc gacccgggtgt ccatcacctg caaagccagc      480
caggacgtgt acaacgccgt ggcctggtat cagcagaagc tggccagag ccccaagctg       540 ctgatctaca gcgccagcag ccggtacacc ggcgtgccca gcaggttcac cggcagcggc      600
agcggcccag acttcacctt caccatcagc agcgtgcagg ccgaggacct ggccgtgtac      660
ttctgccagc agcacttccg gaccccctc accttcggct ccggcaccaa gctggaaatc       720
aag                                                                    723
```

```
<210> SEQ ID NO 5
<211> LENGTH: 135
<212> TYPE: DNA
<213> ORGANISM: Artificial Sequence
<220> FEATURE:
<223> OTHER INFORMATION: CD8 hinge

<400> SEQUENCE: 5
accacgacgc cagcgccgcg accaccaaca ccggcgccca ccatcgcgtc gcagcccctg      60
tccctgcgcc cagaggcgtg ccggccagcg gcggggggcg cagtgcacac gagggggctg     120
gacttcgcct gtgat                                                     135

<210> SEQ ID NO 6
<211> LENGTH: 72
<212> TYPE: DNA
<213> ORGANISM: Artificial Sequence
<220> FEATURE:
<223> OTHER INFORMATION: CD8 Transmembrane domain

<400> SEQUENCE: 6
atctacatct gggcgccctt ggccgggact tgtggggtcc ttctcctgtc actggttatc      60 acccttact gc                                                          72

<210> SEQ ID NO 7
<211> LENGTH: 141
<212> TYPE: DNA
<213> ORGANISM: Artificial Sequence
<220> FEATURE:
<223> OTHER INFORMATION: Fc gamma receptor

<400> SEQUENCE: 7
agacgactca agatccaggt ccgaaaggca gctatagcca gccgtgagaa agcagatgct      60
gtctacacgg gcctgaacac ccggagccag gagacatatg agactctgaa gcatgagaaa     120
ccaccccagg gatccggaag t                                              141

<210> SEQ ID NO 8
<211> LENGTH: 123
<212> TYPE: DNA
<213> ORGANISM: Artificial Sequence
<220> FEATURE:
<223> OTHER INFORMATION: CD28 Intracellular domain

<400> SEQUENCE: 8
aggagtaaga ggagcaggct cctgcacagt gactacatga acatgactcc ccgccgcccc      60
gggcccaccc gcaagcatta ccagccctat gccccaccac gcgacttcgc agcctatcgc     120
tcc                                                                  123

<210> SEQ ID NO 9
<211> LENGTH: 336
<212> TYPE: DNA
<213> ORGANISM: Artificial Sequence
<220> FEATURE:
<223> OTHER INFORMATION: CD3 zetta

<400> SEQUENCE: 9
agagtgaagt tcagcaggag cgcagacgcc cccgcgtacc agcagggcca gaaccagctc      60
tataacgagc tcaatctagg acgaagagag gagtacgatg ttttggacaa gagacgtggc     120
cgggaccctg agatgggggg aaagccgaga aggaagaacc ctcaggaagg cctgtacaat     180
```

```
-continued gaactgcaga aagataagat ggcggaggcc tacagtgaga ttgggatgaa aggcgagcgc    240
cggaggggca aggggcacga tggcctttac cagggtctca gtacagccac caaggacacc    300
tacgacgccc ttcacatgca ggccctgccc cctcgc                              336

<210> SEQ ID NO 10
<211> LENGTH: 575
<212> TYPE: DNA
<213> ORGANISM: Artificial Sequence
<220> FEATURE:
<223> OTHER INFORMATION: IRES

<400> SEQUENCE: 10 gccccctctcc ctccccccc cctaacgtta ctggccgaag ccgcttggaa taaggccggt     60
gtgcgtttgt ctatatgtta ttttccacca tattgccgtc ttttggcaat gtgagggccc   120
ggaaacctgg ccctgtcttc ttgacgagca ttcctagggg tctttcccct ctcgccaaag   180
gaatgcaagg tctgttgaat gtcgtgaagg aagcagttcc tctggaagct tcttgaagac   240
aaacaacgtc tgtagcgacc ctttgcaggc agcggaaccc cccacctggc gacaggtgcc   300
tctgcggcca aaagccacgt gtataagata cacctgcaaa ggcggcacaa ccccagtgcc   360
acgttgtgag ttggatagtt gtggaaagag tcaaatggct cacctcaagc gtattcaaca   420
aggggctgaa ggatgcccag aaggtacccc attgtatggg atctgatctg gggcctcggt   480
gcacatgctt tacatgtgtt tagtcgaggt taaaaaacgt ctaggccccc cgaaccacgg   540
ggacgtggtt ttcctttgaa aaacacgatg ataat                              575

<210> SEQ ID NO 11
<211> LENGTH: 717
<212> TYPE: DNA
<213> ORGANISM: Artificial Sequence
<220> FEATURE:
<223> OTHER INFORMATION: GPF

<400> SEQUENCE: 11
atggtgagca agggcgagga gctgttcacc ggggtggtgc ccatcctggt cgagctggac     60
ggcgacgtaa acggccacaa gttcagcgtg tccggcgagg gcgagggcga tgccacctac   120
ggcaagctga ccctgaagtt catctgcacc accggcaagc tgcccgtgcc ctggcccacc   180
ctcgtgacca ccctgaccta cggcgtgcag tgcttcagcc gctaccccga ccacatgaag   240
cagcacgact tcttcaagtc cgccatgccc gaaggctacg tccaggagcg caccatcttc   300
ttcaaggacg acggcaacta caagacccgc gccgaggtga agttcgaggg cgacaccctg   360
gtgaaccgca tcgagctgaa gggcatcgac ttcaaggagg acggcaacat cctggggcac   420
aagctggagt acaactacaa cagccacaac gtctatatca tggccgacaa gcagaagaac   480
ggcatcaagg tgaacttcaa gatccgccac aacatcgagg acggcagcgt gcagctcgcc   540
gaccactacc agcagaacac ccccatcggc gacggccccg tgctgctgcc cgacaaccac   600
tacctgagca cccagtccgc cctgagcaaa gaccccaacg agaagcgcga tcacatggtc   660
ctgctggagt tcgtgaccgc cgccgggatc actctcggca tggacgagct gtacaag       717
```

METHOD FOR PRODUCING IMMUNE CELLS AND USE THEREOF

CROSS REFERENCE TO RELATED APPLICATIONS

This application is a U.S. National Stage Application of International Application No. PCT/KR2020/004198, filed on Mar. 27, 2020, which claims the benefit under 35 USC 119(a) and 265(b) of Korean Patent Application No. 10-2019-0036264, filed on Mar. 28, 2019, and Korean Patent Application No. 10-2019-0036265, filed on Mar. 28, 2019 in the Korean Intellectual Property Office, the entire disclosure of which is incorporated herein by reference for all purposes.

TECHNICAL FIELD

The present invention relates to a method for producing induced natural killer T (iNKT) cells that are induced by direct reprogramming of isolated somatic cells, and iNKT cells into which a CAR (chimeric antigen receptor) gene encoding a CAR is introduced, iNKT cells produced by the method, and a cell therapy composition and a pharmaceutical composition for preventing or treating cancer, including the iNKT cells.

BACKGROUND ART

Natural killer T (NKT) cells that exist in various tissues and organs such as bone marrow, lymph glands, liver, spleen, blood, etc. are a type of T cells having the characteristics of T lymphocytes and natural killer (NK) cells, and it is known that they express T-cell receptors and surface antigens of T cells or NK cells, such as NK1.1.

Normal T cells recognize antigens presented by MHC (major histocompatibility complex) class I/MHC class II, whereas NKT cells recognize glycolipids (α-GalCer; alpha-galactosylceramide) presented by CD1d (MHC-like molecules). Therefore, NKT cells, which exhibit the same cytotoxicity as T cells and NK cells, do not cause graft-versus-host disease (GVHD) despite being a type of T cells, and thus are recognized as a useful cell resource for the development of not only self-derived but also allogeneic-derived cell therapeutic agents. It is known that activated NKT cells secrete various types of cytokines and chemokines such as IFN (interferon), IL (interleukin)-4, GM-CSF (granulocyte-macrophage colony-stimulating factor), IL-2, IL-13, IL-17, IL-21, and TNF (tumor necrosis factor) to regulate the immune function of NKT cells and various immune cells (NK cells, T cells, B cells, macrophages, etc.), thereby performing an intermediary function between innate immunity and acquired immunity.

Although patient or allogeneic-derived NKT cells present in the human body (peripheral blood, etc.) can be obtained through a primary culture method, which involves simple isolation and amplification, it is known that NKT cells exist in a very limited amount (about 0.1% to 0.01% in leukocytes of peripheral blood) fundamentally, and thus, problems have arisen such as the heterogeneity of cell types between batches depending on the cell source, the complexity and variability of the production process, etc. As an alternative, efforts are being made to secure NKT cells through differentiation of stem cells with the ability to differentiate into NKT cells, but low production efficiency, relatively high time and cost consumption, and a complicated production process have been recognized as problems to be overcome.

Accordingly, in order to enhance the utilization of NKT cells having an excellent potential as immune cell therapeutics, it is necessary to first secure new NKT cell resources or to develop a production method thereof.

Recently, it has been demonstrated that immune cells (CAR-T and CAR-NK cells), which are produced by introducing a cancer cell target chimeric antigen receptor (CAR) gene that targets a specific cancer surface antigen in a similar manner to a monoclonal antibody, as a method for promoting specificity and activation for target cancer cells and consequently enhancing the efficacy of anticancer treatment, have an enhanced anticancer effect, and thus these have received much interest in the development of CAR-immune cell therapeutics. NKT cells (CAR-NKT), whose expression for chimeric antigen receptor (CAR) has been manipulated, can exhibit high anticancer effects directly or indirectly by inducing maturation of dendritic cells and secretion of NK and CD8+ T cell-activating cytokines, unlike T cells exhibiting anticancer-enhancing effects which are dependent on a CAR-specific mechanism of action. In addition, NKT cells have received attention as a major resource for the development of allogeneic anticancer immune cell therapies because they do not interact with MHC. However, the initial NKT cell resources for producing functionally improved CAR-NKT cells are very limited, and there is a need to secure new NKT cell resources or develop a production method thereof.

Recently, a technology for directly producing high-value-added functional human tissue-specific target cells having characteristics of a different lineage from initial human somatic cells, which are relatively easy to obtain using reprogramming technology of somatic cells, is rapidly developing. However, there has been no report on a technology for producing NKT cells without a differentiation process through direct reprogramming.

DISCLOSURE

Technical Problem

The present inventors have made extensive efforts to develop a method for efficiently producing human NKT cells, and as a result, they have developed an NKT cell-specific reprogramming medium and reprogramming culture conditions, and confirmed that NKT and CAR-NK cells can be produced from human somatic cells by a method that does not require a differentiation process without limiting the initial cell resources, and accordingly, the produced NKT cells exhibit an excellent cancer cell killing ability and thus can be applied to the prevention or treatment of cancer, thereby completing the present invention.

Technical Solution

It is one object of the present invention to provide a method for producing iNKT (induced natural killer T) cells, including: culturing isolated cells introduced with I) a reprogramming factor or II) a reprogramming factor and a CAR (chimeric antigen receptor) gene sequentially in a) a first medium containing growth factors, cytokines, and a GSK3β (glycogen synthase kinase 3 beta) inhibitor; and b) a second medium containing (1) growth factors, cytokines, and an AHR (aryl hydrocarbon receptor) agonist, or (2) growth factors, cytokines, and an anti-CD3 antibody, and thereby directly reprogramming into NKT cells.

It is another object of the present invention to provide iNKT cells produced according to the method.

It is still another object of the present invention to provide a cell therapy composition for preventing or treating cancer, including the iNKT cells produced according to the method above, as an active ingredient.

It is yet another object of the present invention to provide a pharmaceutical composition for preventing or treating cancer, including the iNKT cells produced according to the method above, as an active ingredient.

It is even another object of the present invention to provide a reprogramming medium kit for directly producing iNKT cells, including: a) a first container containing a first medium containing growth factors, cytokines, and a GSK3β inhibitor; and b) a second container containing a second medium containing (1) growth factors, cytokines, and an AHR agonist, or (2) growth factors, cytokines, and an anti-CD3 antibody.

Advantageous Effects

The method according to the present invention can produce, through direct reprogramming, iNKT cells or iNKT cells into which a CAR gene is introduced, from isolated cells so as to simplify the production process and shorten production time, thereby reducing costs, to have excellent NKT cell production efficiency, and to ensure safety according to the production without passing through induced pluripotent stem cells, thereby having an excellent NKT cell production effect distinguished from that of a conventional reprogramming technique. In addition, the iNKT cells or iNKT cells into which a CAR gene is introduced, which are produced by the method, have an excellent cancer cell killing ability, and thus can be effectively used as a cell therapy composition or a pharmaceutical composition for preventing or treating cancer.

BRIEF DESCRIPTION OF DRAWINGS

FIG. 1 (A) is a schematic diagram of a method for producing iNKT by direct reprogramming of somatic cells, and (B) is a result of confirming iNKT cells prepared from PBMC.

FIG. 2 is a result confirming the iNKT cells prepared from CD3+CD8− cells.

FIG. 3 is a result confirming the iNKT production efficiency according to the composition of the iNKT first medium and the second medium.

FIG. 4 is a result confirming the iNKT production efficiency according to the addition of an AHR agonist or an anti-CD3 antibody.

FIG. 5 is a result confirming the frequency of CD107a-expressing cells during co-culture of the produced iNKT cells and cancer cells.

FIG. 6 is a result confirming the cancer cell killing ability of the prepared iNKT cells.

FIG. 7 is a result confirming the tumor growth inhibitory effect of the iNKT cells in a pancreatic cancer cell xenograft mouse animal model.

FIG. 8 is a diagram showing the constitutional domains of four CAR genes.

FIG. 9 is a schematic diagram showing a method for producing CAR-iNKT by direct reprogramming of somatic cells and introduction of CAR genes.

FIG. 10 is a result confirming CD19-CAR-iNKT cells produced by introducing CD19-CAR2 cells.

FIG. 11 is a result confirming MSLN-CAR-iNKT cells produced by introducing MSLN-CAR cells.

FIG. 12 is a result confirming HER2-CAR-iNKT cells produced by introducing HER2-CAR cells.

FIG. 13 is a result confirming the cancer cell killing ability of the produced CD19-CAR2-iNKT cells.

FIG. 14 is a result confirming the cancer cell killing ability of the produced MSLN-CAR-iNKT cells.

FIG. 15 is a result confirming the cancer cell killing ability of the produced HER2-CAR-iNKT cells.

DETAILED DESCRIPTION OF PREFERRED EMBODIMENTS

The present invention will be described in detail below. Meanwhile, each description and embodiment disclosed herein can be applied to other descriptions and embodiments, respectively. That is, all combinations of various elements disclosed herein fall within the scope of the present invention. Further, the scope of the present invention is not limited by the specific description described below.

In order to achieve the above objects, one aspect of the present invention provides a method for producing iNKT (induced natural killer T) cells, including: culturing isolated cells introduced with I) a reprogramming factor or II) a reprogramming factor and a CAR (chimeric antigen receptor) gene sequentially in a) a first medium containing growth factors, cytokines, and a GSK3β (glycogen synthase kinase 3 beta) inhibitor; and b) a second medium containing (1) growth factors, cytokines, and an AHR (aryl hydrocarbon receptor) agonist, or (2) growth factors, cytokines, and an anti-CD3 antibody, and thereby directly reprogramming into NKT cells.

As used herein, the term "NKT (natural killer T) cells" are a type of T lymphocyte cells responsible for innate and adaptive immunity and are found in various tissues of the body. They are divided into two groups according to the T Cell Receptor (TCR) chains. In particular, the type I NKT cells are also known as invariant NKT cells and use an invariant TCR chain with a limited TCR β-chain repertoire, and type II NKT cells broadly express various combinations of TCR chains. It is known that NKT cells can immediately attack and remove target cells, such as infected cells or tumor cells, etc., upon recognition, and thus have received attention as a major target cell for the development of immune cell therapy.

Because NKT cells have anticancer effects that directly or indirectly kill various cancer cells, they are a useful resource to overcome the limitations of existing anticancer therapies, such as therapeutic agents for cancer diseases and inhibitors of recurrence, etc. Although techniques for producing NKT cells mainly through simple isolation and amplification from peripheral blood or differentiation induction culture from stem cells have been developed, problems such as low productivity and high time and cost consumption are being addressed. Therefore, there is a high need for the development of new NKT cell resources.

As a method to promote the specificity and activation for cancer cells, NKT cells (CAR-NKT cells) expressing a chimeric antigen receptor (CAR) specific to various cancer antigens have been produced, and accordingly, there is a rapid increasing interest in developing the CAR-NKT cells as anticancer immune cell therapeutic agents. However, a method of directly introducing a CAR gene into primary cultured NK cells is being used as a method for producing the CAR-NKT cells, and there is a problem of low productivity, etc., as described above.

Therefore, the present inventors have attempted to produce NKT cells under ex vivo culture conditions, and a result, they have identified for the first time a method for directly inducing and producing NKT cells through direct reprogramming.

As used herein, the term "iNKT (induced natural killer T) cell" refer to an NKT (natural killer T) cell induced through direct reprogramming according to the method of the present invention.

As used herein, the term "CAR-iNKT (CAR-induced natural killer T) cell" refers to an NKT (natural killer T) cell which is induced through direct reprogramming according to the method of the present invention and into which a CAR gene is introduced.

As used herein, the term "reprogramming" refers to a method of converting a lineage into a target cell having completely different characteristics by controlling the global gene expression pattern of a specific cell. Reprogramming may include dedifferentiation of cells, direct reprogramming or direct conversion, or direct trans-differentiation, but is not limited thereto. In the present invention, the reprogramming may be performed by introducing a vector containing a foreign gene or DNA into a cell. As used herein, the term "transformation" refers to the change of a cell to a different state, and the term "differentiation" refers to a phenomenon in which daughter cells produced by cell division acquire a function different from that of the original parent cell, and as used herein, the "conversion" and "differentiation" can be used interchangeably with "induction".

As used herein, the term "direct reprogramming" refers to a method of inducing direct conversion to a target cell by culturing a specific cell in a reprogramming medium. In order to produce NKT cells, which are target cells, using conventional reprogramming techniques, 1) induced pluripotent stem cells were produced from isolated somatic cells; 2) hematopoietic stem (progenitor) cells, the intermediate, were subjected to primary differentiation and production from induced pluripotent stem cells; 3) and subsequently, NKT cells, which are target cells, were subjected to secondary differentiation and production from differentiated stem (progenitor) cells. As described above, the conventional technique has disadvantages in that the production efficiency is low and time and cost consumption are large because it has to sequentially go through a complex culture process. In addition, since NKT cells are produced via induced pluripotent stem cells with pluripotency, the remaining undifferentiated cells have the potential to form tumors, and thus safety is an important issue to be verified. In contrast, the present invention produces NKT cells, which are the target cells, directly from isolated somatic cells through direct reprogramming, thereby providing reduced production time and cost, and excellent efficiency and safety, and thus can be distinguished from the prior art and can provide an alternative that can overcome the problems. The direct reprogramming may be used interchangeably with direct dedifferentiation, direct differentiation, direct conversion, direct cross-differentiation, cross-differentiation, etc., and as used herein, the direct reprogramming may mean direct dedifferentiation or cross-differentiation into NKT cells from isolated somatic cells, but is not limited thereto.

As used herein, the term "differentiated cells" refers to a state in which cells with specialized structures or functions, that is, cells, tissues, etc. of living organisms, have changed into a form and function suitable for performing the role assigned thereto. For example, the differentiated cells broadly refer to ectodermal, mesodermal, and endodermal cells derived from pluripotent stem cells such as embryonic stem cells, and narrowly to red blood cells, white blood cells, platelets, etc. derived from hematopoietic stem cells.

As used herein, the term "lineage-conversion cell" refers to a cell which is converted to a cell type with different lineage characteristics due to the change in the intrinsic lineage characteristics of the cell embryologically or artificially (e.g., reprogramming, etc.), thereby having the characteristics of a cell type that are completely different from the characteristics of the cell type before conversion. In the present invention, the lineage-conversion cell may be a target cell. For example, non-NKT lymphocyte cells in peripheral blood mononuclear cells may be converted to NKT cells in a reprogramming medium, but are not limited thereto.

In the present invention, the method may be performed by culturing isolated cells introduced with I) a reprogramming factor or II) a reprogramming factor and a CAR (chimeric antigen receptor) gene sequentially in a) a first medium containing growth factors, cytokines, and a GSK3β (glycogen synthase kinase 3 beta) inhibitor; and b) a second medium containing (1) growth factors, cytokines, and an AHR (aryl hydrocarbon receptor) agonist, or (2) growth factors, cytokines, and an anti-CD3 antibody, and thereby directly reprogramming into NKT cells.

As used herein, the term "isolated cells" is not particularly limited, but specifically refers to cells whose lineage has already been specified, such as germ cells, somatic cells, or progenitor cells. The "somatic cells" refer to all cells in which differentiation constituting animals and plants has been completed except for germ cells. The "progenitor cells" refer to a mother cell which does not express a differentiated character, but has a differentiation fate, if it has been found that a cell corresponding to its progeny expresses a certain differentiation character. For example, as for the nerve cells (neurons), nerve fibroblasts (neuronal stem cells) correspond to the precursor cells, and as for the myotube, myoblasts correspond to the precursor cell.

The isolated cells may be cells derived from a human, but are not limited thereto, and cells derived from various individuals may also fall within the scope of the present invention. In addition, the isolated cells of the present invention may include both in vivo or ex vivo cells. Specifically, the isolated cells may be somatic cells, and more specifically somatic cells other than NKT cells, but are not limited thereto.

As used herein, the term "reprogramming factor" refers to a gene (or polynucleotide) that can be introduced into a cell to induce reprogramming, or a protein encoded therefrom. The reprogramming factor may vary depending on the target cell to be obtained through reprogramming, and the type of cell before reprogramming. For example, when isolated somatic cells are to be induced into NKT cells, the reprogramming factor introduced into the isolated somatic cells may include any one or more selected from the group consisting of Lin28, Asc11, Pitx3, Nurr1, Lmx1a, Nanog, Oct4, Oct3, Sox2, Klf4, Myc, and a combination thereof, and specifically Oct4, Sox2, Klf4, and Myc, but is not limited thereto, and may include any factor known in the art as long as it is a reprogramming factor that can induce the isolated somatic cells into NK cells. The reprogramming using the reprogramming factor is the induction of conversion to a target cell by controlling the entire gene expression pattern of the cell, and the cell may be reprogrammed into a target cell having a gene expression pattern of a desired type of cell by introducing the reprogramming factor into the cell and culturing the same for a certain period of time.

As used herein, the "introduction of a reprogramming factor" may be a method of administering a reprogramming factor to a culture solution of cells; a method of directly injecting a reprogramming factors into cells; a method of increasing the expression level of a reprogramming factor present in a cell; a method of transforming a cell with an expression vector containing a gene encoding a reprogramming factor; a method of modifying a gene sequence to increase the expression of a gene encoding a reprogramming factor; a method of introducing an exogenously expressed gene encoding a reprogramming factor; a method of treating a substance having an effect of inducing expression of the reprogramming factor; and a method of increasing the expression level of a reprogramming factor in a cell through a combination thereof, but is not limited thereto as long as it can increase the expression level of the reprogramming factor. In particular, the introduction of a reprogramming factor may be inducing expression of a reprogramming factor depending on desired time and conditions. Specifically, the method of introducing a reprogramming factor into a cell may be a method of administering a reprogramming factor to a cell culture solution, or a method of transforming a cell with an expression vector containing a gene encoding a reprogramming factor, but this not limited.

The method of directly injecting a reprogramming factor into a cell may be performed by selecting any method known in the art, but is not limited thereto, and may be performed by appropriately selecting from the methods using micro-injection, electroporation, particle bombardment, direct muscle injection, an insulator, and a transposon.

As used herein, the term "vector" refers to a DNA construct containing the nucleotide sequence of a suitable regulatory sequence and the target protein or polypeptide so as to be able to express the target protein or polypeptide in a suitable host cell. The regulatory sequence may include a promoter, an operator, an initiation codon, a termination codon, a polyadenylation signal, an enhancer, etc. The vector of the present invention may include a signal sequence or a leader sequence for membrane targeting or secretion, in addition to the regulatory sequence, and can be prepared in various ways depending on the desired purpose. The promoter of the vector may be constitutive or inducible. Further, the vector may include a selective marker for selecting a host cell containing the vector, and in the case of a replicable vector, may include a replication origin. Once transformed into a suitable host cell, the vector may replicate or function independently of the host genome, or may integrate into the genome thereof.

The vector used in the present invention is not particularly limited as long as it is able to replicate in the host cell, and any vector known in the art may be used. Examples of the vector conventionally used may include a natural or recombinant virus vector, episomal vector, plasmid vector, cosmid vector, etc.

Specifically, the virus vector may include vectors derived from retrovirus such as Sendai virus, lentivirus, HIV (human immunodeficiency virus), MLV (murine leukemia virus), ASLV (avian sarcoma/leukosis), SNV (spleen necrosis virus), RSV (Rous sarcoma virus), MMTV (mouse mammary tumor virus), etc., adenovirus, adeno-associated virus, herpes simplex virus, and more specifically, it may be an RNA-based virus vector, but is not limited thereto.

The episomal vector is a non-viral non-insertable vector, and is known to have a property of expressing a gene included in the vector without being inserted into a chromosome. Accordingly, the cell containing the episomal vector may include both cases in which the episomal vector is inserted into the genome or is present in a cell without being inserted into the genome.

As used above, the term "operably linked" refers to a functional linkage between a nucleic acid expression regulatory sequence and a nucleic acid sequence encoding a target protein so as to perform a general function. The operative linkage with the recombinant vector can be prepared using genetic recombination techniques well known in the art, and site-specific DNA cleavage and ligation are carried out using enzymes generally known in the art.

As used herein, the term "culture" means that the microorganism is grown under appropriately controlled environmental conditions. The culturing process of the present invention may be performed in a suitable culture medium and culture conditions known in the art. Such a culturing process may be easily adjusted for use by those skilled in the art according to the strain to be selected. For the purpose of the present invention, the culture is a process of converting cells into which reprogramming factors have been introduced into target cells of another lineage. Thus, the composition of the first medium or the second medium for culturing the cells into which the reprogramming factor is introduced is a composition suitable for conversion into target cells, and for example, may include growth factors, cytokines, a GSK3β inhibitor, an AHR agonist, or an anti-CD3 antibody, etc., but is not limited thereto.

The first medium of a) may include a growth factor, cytokines, and a GSK3β inhibitor.

As used herein, the term "growth factor" means a polypeptide that promotes the division, growth, and differentiation of various cells. The growth factor may be, for example, EGF (epidermal growth factor), PDGF-AA (platelet-derived growth factor-AA), IGF-1 (insulin-like growth factor 1), TGF-β (transforming growth factor-β), FGF (fibroblast growth factors), SCF (stem cell factor), and FLT3 (FMS-like tyrosine kinase), and may specifically be any one or more selected from the group consisting of SCF, FLT3, and a combination thereof, but is not limited thereto.

As used herein, the "cytokines" are various proteins of relatively small size that are produced in cells and used for cell signaling, and can affect other cells, including themselves. They are generally known to be involved in the immune response to inflammation or infection. The cytokines may be, for example, IL (interleukin)-2, IL-3, IL-5, IL-6, IL-7, IL-11, IL-15, BMP4 (bone morphogenetic protein 4), acivin A, notch ligand, G-CSF (granulocyte-colony stimulating factor), SDF-1 (stromal cell-derived factor-1), etc., and may specifically be any one or more selected from the group consisting of IL-3, IL-6, IL-2, IL-7, IL-15, and a combination thereof, but is not limited thereto.

For the purpose of the present invention, the growth factors and cytokines are included in the medium for directly reprogramming the isolated cells into the target cells, and the types of growth factors and cytokines are not particularly limited as long as they can be used for direct reprogramming.

As used herein, the term "GSK3β (glycogen synthase kinase 3 beta, glycogen synthase kinase-3β) inhibitor" means a substance that suppresses or inhibits the activity of GSK3β. The GSK3β inhibitor may be, for example, 1-azakenpaullone, 2-D08, 3F8, 5-bromoindole, 6-Bio, A 1070722, aloisine A, AR-A014418, alsterpaullone, AZD-1080, AZD2858, bikinin, BIO, BIO-acetoxime, bisindolylmaleimide I, bisindolylmaleimide I hydrochloride, CAS 556813-39-9, cazpaullone, CHIR98014, CHIR98023, CHIR99021 (CT99021), CP21R7, dibromocantherelline, GSK-3β inhibitor I, VI, VII, X, XI, XV, GSK-3 inhibitor IX, XVI, hymenidin, hymenialdisine, HMK-32, 13M (indirubin-3-monoxime, indirubin, indole-3-acetamide, IM-12, kenpaullone, L803-mts, leucettine L41, lithium, lithium carbonate, LY-2090314, manzamine A MeBIO, meridianine A, NP00111, NP031115, NP031111, NSC 693868, palinurin, Ro 31-8220 methanesulfonate, SB-216763, SB-415286, TC-G 24, TCS 2002, TCS 21311, tideglusib, tricantin, trihydrochloride, tungstate, TWS-119, TZDZ-8, zinc, etc., and may specifically be CHIR99021, but is not limited thereto.

The first medium of a) may include SCF, FLT3, IL-3, and IL-6 and CHIR99021, but is not limited thereto.

The first medium of a) may further include any one or more selected from the group consisting of fetal bovine serum (FBS), antibiotics, and a combination thereof, but is not limited thereto.

The antibiotic may be penicillin/streptomycin, but is not limited thereto. Specifically, the first medium of a) may include FBS, penicillin/streptomycin, SCF, FLT3, IL-3, and IL-6 and CHIR99021, but is not limited thereto.

More specifically, the first medium of a) may be StemSpan SFEM II containing 8% to 12% FBS, 0.1% to 2% penicillin/streptomycin, 50 ng/mL to 200 ng/mL human SCF, 50 ng/mL to 200 ng/mL human FLT3, 10 ng/mL to 30 ng/mL human IL-3, 10 ng/mL to 30 ng/mL human IL-6, and 2 µM to 8 µM CHIR99021, and more specifically StemSpan SFEM II containing 10% FBS, 1% penicillin/streptomycin, 100 ng/mL human SCF, 100 ng/mL human FLT3, 20 ng/mL human IL-3, 20 ng/mL human IL-6, and 5 µM CHIR99021, but is not limited thereto.

The second medium of b) may include (1) growth factors, cytokines, and an AHR (aryl hydrocarbon receptor) agonist, or (2) growth factors, cytokines, and an anti-CD3 antibody.

The terms "growth factor" and "cytokine" are the same as described above.

As used herein, the term "AHR (aryl hydrocarbon receptor) agonist" refers to a substance that binds to AHR, a ligand-activated transcription factor activated by TCDD (dioxin (2,3,7,8-tetrachlorodibenzo-p-dioxin)), for activation. The AHR agonist may be, for example, TCDD (2,8-dihydroxyquinoline, 2,3,7,8-tetrachlorodibenzo-p-dioxin), FICZ (6-formylindolo[3,2-b]carbazole), biochanin A, etc., and may specifically be any one or more selected from the group consisting of FICZ, biochanin A, and a combination thereof, but is not limited thereto.

As used herein, the "anti-CD3 antibody" is a protein that specifically reacts to the CD3 antigen, which is a group of molecules that binds to a T cell receptor (TCR) to form an antigen recognition complex, and the CD3 molecules have a longer intracellular region as compared to TCR and are known to deliver antigen recognition signals into cells. The anti-CD3 antibody may be, for example, OKT-3, UCHT1, HIT3a, etc., and may specifically be any one or more selected from the group consisting of OKT3, UCHT1, and combinations thereof, but is not limited thereto.

The second medium of b) may include SCF, FLT3, IL-2, IL-7, IL-15, FICZ, and biochanin A in the case of the second medium containing the AHR agonist (1), or may include SCF, FLT3, IL-2, IL-7, IL-15, OKT3, and UCHT1 in the case of the second medium containing the anti-CD3 antibody (2), but is not limited thereto.

The second medium of b) may further include any one or more selected from the group consisting of FBS, antibiotics, and a combination thereof, but is not limited thereto.

The antibiotic may be penicillin/streptomycin, but is not limited thereto.

Specifically, the second medium of b) may include FBS, penicillin/streptomycin, SCF, FLT3, FLT3, IL-2, IL-7, IL-15, FICZ, and biochanin A in the case of the second medium containing the AHR agonist (1), or may include FBS, penicillin/streptomycin, SCF, FLT3, FLT3, IL-2, IL-7, IL-15, OKT3, and UCHT1 in the case of the second medium containing the anti-CD3 antibody (2), but is not limited thereto.

More specifically, in the second medium of b), the second medium containing the AHR agonist (1) may be StemSpan SFEM II containing 8% to 12% FBS, 0.1% to 2% penicillin/streptomycin, 10 ng/mL to 30 ng/mL human SCF, 10 ng/mL to 30 ng/mL human FLT3, 100 IU/mL to 500 IU/mL human IL-2, 10 ng/mL to 30 ng/mL human IL-7, 10 ng/mL to 30 ng/mL human IL-15, 1 µM to 3 µM FICZ, and 10 µg/mL to 30 µg/mL biochanin A, and more specifically StemSpan SFEM II containing 10% FBS, 1% penicillin/streptomycin, 20 ng/mL human SCF, 20 ng/mL human FLT3, 200 IU/mL human IL-2, 20 ng/mL human IL-7, 20 ng/mL human IL-15, 2 µM FICZ, and 20 µg/mL biochanin A, but is not limited thereto.

In the second medium of b), the second medium containing the anti-CD3 antibody (2) may be StemSpan SFEM II containing 8% to 12% FBS, 0.1% to 2% penicillin/streptomycin, 10 ng/mL to 30 ng/mL human SCF, 10 ng/mL to 30 ng/mL human FLT3, 100 IU/mL to 500 IU/mL human IL-2, 10 ng/mL to 30 ng/mL human IL-7, 10 ng/mL to 30 ng/mL human IL-15, 5 ng/mL to 15 ng/mL OKT3, and 5 ng/mL to 15 ng/mL UCHT1, and more specifically StemSpan SFEM II containing 10% FBS, 1% penicillin/streptomycin, 20 ng/mL human SCF, 20 ng/mL human FLT3, 200 IU/mL human IL-2, 20 ng/mL human IL-7, 20 ng/mL human IL-15, 10 ng/mL OKT3, and 10 ng/mL UCHT1, but is not limited thereto.

In the method above, the isolated cells, into which the reprogramming factor is introduced, may be cultured in the first medium of a) for 4 to 8 days, and then cultured in the second medium of b) for 12 days or more, but is not limited thereto.

In one embodiment of the present invention, in order to transform the reprogramming factor into peripheral blood mononuclear cells or CD3+CD8− cell group, which is a T cell subtype constituting peripheral blood mononuclear cells, Sendai virus expressing the reprogramming factor was cultured with the cells for 1 day, and the transformed cells were cultured in the iNKT first medium for 5 days, and then cultured in the iNKT second medium containing the AHR (aryl hydrocarbon receptor) agonist or the iNKT second medium containing the anti-CD3 antibody for 12 to 35 days. As a result, it was confirmed that 62% of the peripheral blood mononuclear cells and 94.1% of the CD3+CD8− cell group were induced into iNKT cells (FIGS. 1B and 2).

In another embodiment of the present invention, it was confirmed that the iNKT cell production efficiency was 3.7 to 4.7 times higher when the AHR agonist or the anti-CD3 antibody was contained in the iNKT second medium as compared to the medium without containing the same (FIG. 4). Accordingly, it was confirmed from the result that the AHR agonist or anti-CD3 antibody plays an important role in the NKT production method through direct reprogramming.

As used herein, the term "CAR gene" refers to a gene encoding a chimeric antigen receptor consisting of an extracellular domain, a transmembrane domain, and an intracellular domain including genes encoding the extracellular domain, the transmembrane domain, and the intracellular domain including an antibody domain (scFv). For the purpose of the present invention, the CAR gene may be any one or more selected from the group consisting of a CD19-CAR1 gene or CD19-CAR2 gene including CD19 scFv, a MSLN-CAR gene including MSLN (mesothelin) scFv, and a HER2-CAR gene including HER2 (human epidermal growth factor receptor 2) scFv, but is not limited thereto.

It is known that the CAR target factors for solid tumors include EGFRvIII (Morgan R A, *Hum Gene Ther.* 2012; 23:1043-1053), MUC-1 (Wilkie S, *J Immunol.* 2008; 180: 4901-4909), MAGE (Willemsen R A, *Gene Ther.* 2001; 8:1601-1608), CEA (Emtage P C, *Clin Cancer Res.* 2008; 14:8112-8122), PSMA, GD2, CA125, Her2 and MSLN, FAP, VEGFR (Kakarla S, Cancer J. 2014; 20:151-155), etc.

Additionally, the CD19 is the cluster of differentiation (CD) assigned with number 19 for identifying cell surface molecules according to the immunophenotype, and the CD19 refers to a marker of B lymphocytes. The CD19 is known to be expressed in most B-cell malignant cancer cells and thus provides an ideal target for these carcinomas.

Specifically, the CAR gene may be any one or more selected from the group consisting of:

i) a CAR gene (CD19-CAR1 gene) including CD8 leader, CD19 scFv, CD8 hinge, CD8 transmembrane domain, and Fc-γ receptor;

ii) a CAR gene (CD19-CAR2 gene) including CD8 leader, CD19 scFv, CD8 hinge, CD8 transmembrane domain, CD28 intracellular domain, CD3ζ, and IRES (internal ribosome entry site);

iii) a CAR gene (MSLN-CAR gene) including CD8 leader, MSLN (mesothelin) scFv, CD8 hinge, CD8 transmembrane domain, CD28 intracellular domain, CD3ζ, and IRE; and iv) a CAR gene (HER2-CAR gene) including CD8 leader, HER2 (human epidermal growth factor receptor 2) scFv, CD8 hinge, CD8 transmembrane domain, CD28 intracellular domain, CD3ζ, and IRES, but is not limited thereto.

The CD8 leader may include a nucleotide sequence of SEQ ID NO: 1, CD19 scFv may include a nucleotide sequence of SEQ ID NO: 2, MSLN scFv may include a nucleotide sequence of SEQ ID NO: 3, HER2 scFv may include a nucleotide sequence of SEQ ID NO: 4, CD8 hinge may include a nucleotide sequence of SEQ ID NO: 5, CD8 transmembrane domain may include a nucleotide sequence of SEQ ID NO: 6, Fc-γ receptor may include a nucleotide sequence of SEQ ID NO: 7, CD28 intracellular domain may include a nucleotide sequence of SEQ ID NO: 8, CD3ζ may include a nucleotide sequence of SEQ ID NO: 9, and the IRES inserted to clone the CAR gene into a vector constituting a double cistron may include a nucleotide sequence of SEQ ID NO: 10, but these are not limited thereto.

The CAR gene may further include GFP (green fluorescent protein), but is not limited thereto.

The GFP may include a nucleotide sequence of SEQ ID NO: 11, but is not limited thereto.

The nucleotide sequences of SEQ ID NO: 1 to SEQ ID NO: 11 can be confirmed from NCBI Genbank, a known database.

In the present invention, the nucleotide sequences of SEQ ID NO: 1 to SEQ ID NO: 11 may include a nucleotide sequence having at least 70%, 80%, 85%, 90%, 95%, 96%, 97%, 98%, or 99% or more homology or identity with SEQ ID NO: 1 to SEQ ID NO: 11. Additionally, it is apparent that a nucleotide sequence in which a part of the sequence is deleted, modified, substituted, or added may be included within the scope of the present invention as long as the nucleotide sequence has such homology or identity and exhibits a function corresponding to the nucleotide sequences of SEQ ID NO: 1 to SEQ ID NO: 11.

As used herein, the term "homology and identity" refers to a degree of relatedness between two given amino acid sequences or nucleotide sequences, and may be expressed as a percentage. The terms homology and identity may often be used interchangeably with each other.

The sequence homology or identity of conserved polynucleotides or polypeptides may be determined by standard alignment algorithms and can be used with a default gap penalty established by the program being used. Substantially, homologous or identical sequences are generally expected to hybridize to all or at least about 50%, 60%, 70%, 80%, or 90% or more of the entire length of the sequences under moderate or highly stringent conditions. Polynucleotides that contain degenerate codons instead of codons in hybridizing polynucleotides are also considered.

The homology or identity of the polypeptide or polynucleotide sequences may be determined by, for example, BLAST algorithm by literature [see Karlin and Altschul, Pro. Natl. Acad. Sci. USA, 90, 5873(1993)], or FASTA by Pearson (see Methods Enzymol., 183, 63, 1990). Based on the algorithm BLAST, a program referred to as BLASTN or BLASTX has been developed (see: http://www.ncbi.nlm.nih.gov). Further, whether any two amino add or polynucleotide sequences have a homology, similarity, or identity with each other may be identified by comparing the sequences in a Southern hybridization experiment under stringent conditions as defined, and appropriate hybridization conditions defined are within the skill of the art, and may be determined by a method well known to those skilled in the art (for example, J. Sambrook et al., *Molecular Cloning, A Laboratory Manual,* 2nd Edition, Cold Spring Harbor Laboratory Press, Cold Spring Harbor, N.Y., 1989; F. M. Ausubel et al., *Current Protocols in Molecular Biology*).

In the present invention, the CAR gene may be introduced into the cell in the same manner as the above-described method for introducing a reprogramming factor, and in particular, the reprogramming factor and the CAR gene may be introduced simultaneously or sequentially according to a desired time and conditions.

The CAR gene is introduced into the isolated cells during any one selected from culturing in the first medium of a), or the second medium of b) when introducing the reprogramming factor, but the introduction is not limited thereto.

Specifically, as shown in blue in FIG. 9, the lentivirus expressing CAR may be transformed into PBMC at the time of conversion into iNKT or into cells at the time of reprogramming induction process by inoculating into a culture medium selected from the steps of culturing in the iNKT first medium of (a), or the iNKT second medium of (b), simultaneously with the reprogramming factor (day 0) or after introduction of the reprogramming factor. The method according to the present invention is significant in that CAR-expressing NKT cells can be produced by introducing the CAR gene and the reprogramming factor into isolated cells other than NKT cells. In addition, it is significant in that the time of introducing the CAR gene can be determined as desired by those skilled in the art during the reprogramming culturing process.

Further, the CAR gene may be transformed into NKT cells during induction, when a viral vector expressing the gene is added to any one or more culturing steps during culturing in the first medium or the second medium, by further culturing for 4 to 28 days after the addition, but is not limited thereto.

In one embodiment of the present invention, in order to induce reprogramming of peripheral blood mononuclear cells into CAR-NKT cells, Sendai viruses containing a gene encoding a reprogramming factor were cultured together with peripheral blood mononuclear cells for 1 day, and the transformed cells were cultured in the iNKT first medium for 5 to 6 days, and then cultured in the iNKT second medium containing the anti-CD3 antibody or the iNKT second medium containing the AHR agonist for 12 to 35 days (FIG. 9). In this process, lentiviruses expressing the CD19-CAR1 gene, CD19-CAR2 gene, MSLN-CAR gene, or HER2-CAR gene were transformed to produce CAR-iNKT cells simultaneously with the reprogramming factor or after the reprogramming factor was introduced (FIG. 9).

In one embodiment of the present invention, when producing CAR-iNKT cells according to the method of the present invention, it was confirmed that the CD19-CAR-iNKT cells were produced with an efficiency of 20.3% (FIG. 10), the MSLN-CAR-iNKT cells were produced with an efficiency of 28.8% (FIG. 11), and the HER2-CAR-iNKT cells were produced with an efficiency of 33.1% (FIG. 12).

The iNKT cells produced according to the method of the present invention may express any one or more selected from the group consisting of CD56+, CD3+, and a combination thereof, but are not limited thereto.

The "CD56+" and "CD3+" are indicators on the surface of NKT cells, and in the present invention, the expression of CD56+, CD3+, and a combination thereof was analyzed through flow cytometry to determine whether NKT cells were produced (FIGS. 1B, 2, 4, and 10 to 12).

In addition, the iNKT cells produced according to the method of the present invention may have an excellent killing ability against various cancer cells.

In one embodiment of the present invention, the frequency (%) of CD107a+ cells having a cancer cell lysis ability was increased in cancer cells co-cultured with the iNKT cells (FIG. 5), and as a result of confirming the killing ability of iNKT cells against blood cancer cell lines, colorectal cancer cell lines, prostate cancer cell lines, liver cancer cell lines, lung cancer cell lines, pancreatic cancer cell lines, it was confirmed that they exhibited an excellent killing ability (FIG. 6). Additionally, it was confirmed that the tumor size was significantly reduced on the 14th day after the injection of iNKT cells in a mouse model with pancreatic cancer, compared to the control group which was not injected with iNKT cells (FIG. 7).

Further, in another embodiment of the present invention, it was confirmed that the iNKT cells into which the CD19-CAR2 gene, the MSLN-CAR gene, or the HER2-CAR gene was introduced exhibited higher cancer cell killing ability than the iNKT cells into which the CAR gene was not introduced (FIGS. 13 to 15)

Another aspect of the present invention provides iNKT cells produced according to the method above. The terms used herein are the same as described above.

As described above, the iNKT cells may have an excellent killing ability against various cancer cells.

Still another aspect of the present invention provides a cell therapy composition for preventing or treating cancer, including the iNKT cells produced according to the method above, as an active ingredient.

The terms used herein are the same as described above.

As used herein, the term "prevention" refers to all actions that suppress or delay cancer by the administration of the composition.

As used herein, the term "treatment" refers to all actions that alleviate or beneficially change the symptoms of cancer by the administration of the composition.

As used herein, the term "cell therapeutic agent" refers to a drug for treatment, diagnosis, and prevention (U.S. FDA guidance) containing cells or tissues prepared from humans via isolation, culture, and specialized manipulations, and to a drug for treatment, diagnosis, and prevention prepared by any process including proliferating and selecting autologous, homologous, or heterologous cells ex vivo, or modifying the biological characteristics of cells, so as to restore the function of cells or tissues.

The cell therapy composition may have an efficacy of preventing or treating cancer by including the iNKT cells produced according to the method of the present invention.

The cell therapy composition may contain the iNKT cells at $1.0 \times 10^4$ cells/mL to $10 \times 10^{10}$ cells/mL, preferably $10 \times 10^5$ cells/mL to $10 \times 10^9$ cells/m L, based on the total weight of the composition, but is not limited thereto.

The cell therapy composition may be administered by formulating it into a pharmaceutical formulation in the form of unit dosage suitable for administration to the body of a patient by conventional methods in the pharmaceutical field, and it contains an effective amount by a single dose or in divided doses. For this purpose, a formulation for parenteral administration may preferably include injection formulation such as an injection ampoule, infusion formulation such as an infusion bag, and spray formulation such as an aerosol, etc. The injection ampoule may be mixed with injection solution such as saline solution, glucose, mannitol, and Ringer's solution just before use. Further, the cells can be carried by an infusion bag textured with polyvinyl chloride or polyethylene, and examples thereof may include infusion bags manufactured by Baxter, Becton Dickinson, Medcep, National Hospital Products, or Terumo.

The pharmaceutical formulation may additionally include one or more pharmaceutically acceptable inactive carriers, in addition to the active ingredient, for example, a preservative, analgesic controller, solubilizer, or stabilizer for injection formulation, and a base, excipient, lubricant, or preservative for topical formulation.

The thus-produced cell therapy composition of the present invention or a pharmaceutical formulation thereof may be administered in accordance with any conventional method in the art together with other cells used for treatment of cancer, or in the form of a mixture therewith. Direct engraftment or transplantation to the diseased area of a patient in need of treatment, or direct transplantation or injection into the abdominal cavity is preferred, but the method is not limited thereto. Further, both non-surgical administration using a catheter and surgical administration such as injection or transplantation after incision of the diseased area are possible. In addition, the composition may also be administered parenterally by the conventional method, for example, transplantation of cells into the hematopoietic system, in addition to direct administration to the lesion.

The cell therapy composition of the present invention may be administered in an amount ranging from about 0.0001 mg/kg to 1000 mg/kg, preferably 0.001 mg/kg to 100 mg/kg once per day or in several divided doses per day. However, it should be understood that the amount of the active ingredient actually administered ought to be determined in light of various relevant factors including the disease to be treated, the severity of the disease, the route of administration, and the body weight, age, and sex of a patient, and therefore, the above dose should not be intended to limit the scope of the present invention in any way.

Yet another aspect of the present invention provides a pharmaceutical composition for preventing or treating cancer, including the iNKT cells produced according to the method above, as an active ingredient.

The terms used herein are the same as described above.

In the present invention, the cancer may be a cancer showing prevention or treatment results due to an immune response of iNKT cells, etc. The cancer may be, for example fibrosarcoma, myxosarcoma, liposarcoma, chondrosarcoma cancer, osteogenic sarcoma, myeloma, myeloma, myelodysplasia, lymphoma, non-Hodgkin's lymphoma, blood cancer, melanoma, chordoma, angiosarcoma, endothelial sarcoma, lymphangiosarcoma, lymphangioendothelioma, synovial sarcoma, mesothelioma, Ewing's sarcoma, gastric cancer, leiomyosarcoma, rhabdomyosarcoma, colon carcinoma, colon cancer, colorectal cancer, rectal cancer, pancreatic cholangiocarcinoma, pancreatic cancer, biliary tract cancer, gallbladder cancer, liver cancer, breast cancer, ovarian cancer, uterine cancer, prostate cancer, preleukemia, leukemia, acute leukemia, B-cell acute lymphoblastic leukemia (BALL), T-cell acute lymphoblastic leukemia (TALL), small lymphocytic leukemia (SLL), acute lymphoblastic leukemia (ALL); chronic leukemia, chronic myelogenous leukemia (CML), chronic lymphocytic leukemia (CLL), squamous cell carcinoma, basal cell carcinoma, adenocarcinoma, sweat gland carcinoma, sebaceous adenocarcinoma, papillary thyroid cancer, cyst cancer, medullary thyroid cancer, bronchogenic carcinoma, renal cell carcinoma, liver cancer, biliary duct carcinoma, choriocarcinoma, seminoma, embryonic carcinoma, Wilms' tumor, cervical cancer, testicular tumor, lung carcinoma, lung cancer, small cell lung carcinoma, bladder carcinoma, epithelial carcinoma, head and neck cancer, brain cancer, glioma, astrocytoma, renal cell carcinoma, glioblastoma, medulloblastoma, craniopharyngioma, ependymoma, pineal gland tumor, hemangioblastoma, acoustic neuroma, oligodendroglioma, meningioma, melanoma, neuroblastoma, retinoblastoma, and sarcoma, and may specifically be any one or more selected from the group consisting of pancreatic cancer, lung cancer, ovarian cancer, breast cancer, colorectal cancer, bone marrow cancer, liver cancer, brain cancer, prostate cancer, stomach cancer, colon cancer, glioma, melanoma, lymphoma, rectal cancer, blood cancer, and a combination thereof, and more specifically any one or more selected from the group consisting of blood cancer, colorectal cancer, prostate cancer, liver cancer, lung cancer, pancreatic cancer, and a combination thereof, but is not limited thereto.

Additionally, the cancer may be a cancer showing prevention or treatment results due to an immune response of CAR-iNK cells, etc., and may be a cancer associated with expression of any one or more of CD19, MSLN, or HER2, for example, any one or more selected from the group consisting of myelodysplasia, myelodysplastic syndrome, preleukemia, blood cancer, acute leukemia, B-cell acute lymphoblastic leukemia (BALL), T-cell acute lymphoblastic leukemia (TALL), small lymphocytic leukemia (SLL), acute lymphoblastic leukemia (ALL), chronic leukemia, chronic myelogenous leukemia (CML), chronic lymphocytic leukemia (CLL), non-Hodgkin's lymphoma, lymphoma, myeloma, pancreatic cancer, biliary tract cancer, lung cancer, ovarian cancer, breast cancer, uterine cancer, rectal cancer, colorectal cancer, colon cancer, bone marrow cancer, liver cancer, brain cancer, prostate cancer, stomach cancer, glioma, melanoma, squamous cell carcinoma, head and neck cancer, renal cell cancer, glioblastoma, medulloblastoma, sarcoma, and a combination thereof, and more specifically any one or more selected from the group consisting of blood cancer, colorectal cancer, prostate cancer, liver cancer, lung cancer, pancreatic cancer, and a combination thereof, but is not limited thereto.

The pharmaceutical composition may have an efficacy of preventing or treating cancer by including the iNKT cells produced according to the method of the present invention.

The pharmaceutical composition of the present invention may contain the iNKT cells at $1.0 \times 10^4$ cells/mL to $1.0 \times 10^{10}$ cells/mL, preferably $1.0 \times 10^5$ cells/mL to $1.0 \times 10^9$ cells/mL, based on the total weight of the composition, but is not limited thereto.

The pharmaceutical composition may further include a pharmaceutically acceptable carrier, excipient, or diluent commonly used in the preparation of the pharmaceutical compositions, and the carrier may include a carrier which does not occur naturally. The carriers, excipients, and diluents may include lactose, dextrose, sucrose, sorbitol, mannitol, xylitol, erythritol, maltitol, starch, acacia rubber, alginate, gelatin, calcium phosphate, calcium silicate, cellulose, methyl cellulose, microcrystalline cellulose, polyvinyl pyrrolidone, water, methylhydroxybenzoate, propylhydroxybenzoate, talc, magnesium stearate, and minerals.

Further, the pharmaceutical composition may be formulated according to a conventional method into a tablet, a pill, a powder, a granule, a capsule, a suspension, a solution for internal use, an emulsion, a syrup, a sterilized aqueous solution, a non-aqueous solution, a suspension, an emulsion, a lyophilized preparation, a transdermal preparation, a gel, a lotion, an ointment, a cream, a patch, a cataplasma form, a paste, a spray, a skin emulsion, a skin suspension, a transdermal patch, a drug-containing bandage, or a suppository for use.

Specifically, the preparation may be formulated with commonly used diluents or excipients, such as fillers, extenders, binders, wetting agents, disintegrants, surfactants, etc. Solid formulations for oral administration may include tablets, pills, powders, granules, capsules, etc., but are not limited thereto. Such solid formulations may be prepared by mixing with at least one excipient, for example, starch, calcium carbonate, sucrose, lactose, gelatin, etc. In addition to simple excipients, lubricants such as magnesium stearate or talc may also be used. Liquid formulations for oral administration may be prepared by adding various excipients, for example, wetting agents, flavoring agents, aromatics, preservatives, etc. in addition to liquid paraffin. Formulations for parenteral administration may include sterile aqueous solutions, non-aqueous solvents, suspensions, emulsions, lyophilized preparations, and suppositories. The non-aqueous solutions and the suspensions may include propylene glycol, polyethylene glycol, vegetable oil such as olive oil, injectable ester such as ethyloleate, etc. The base for suppositories may include witepsol, macrogol, tween 61, cacao butter, laurin butter, glycerogelatin, etc.

The pharmaceutical composition of the present invention may be administered in a pharmaceutically effective amount. As used herein, the term "pharmaceutically effective amount" means an amount which is sufficient to treat diseases at a reasonable benefit/risk ratio applicable to any medical treatment. The effective dosage level may be determined depending on factors including a kind of a subject and severity, age, sex, activity of a drug, drug sensitivity, administration time, administration route, excretion rate, duration of treatment, drugs used concurrently, and other factors known in the medical field. For example, the pharmaceutical composition may be administered in a daily dosage of 0.0001 mg/kg to 1000 mg/kg, and specifically 0.001 mg/kg to 100 mg/kg, and the dose may be administered once per day or in several divided doses per day.

The pharmaceutical composition may be administered alone as an individual therapeutic agent or in combination with other therapeutic agents, and may be administered sequentially or simultaneously with existing therapeutic agents. The composition may be administered in a single or multiple dosage form. It is important to administer the composition in a minimum amount that may exhibit a maximum effect without causing side effects, considering all of the above-described factors. The amount may be readily determined by those skilled in the art.

As used herein, the term "administration" means introducing the composition of the present invention into a subject by any suitable method. The administration route of the composition may be administered through any general route as long as it can reach the target tissue, including intraperitoneal administration, intravenous administration, intramuscular administration, subcutaneous administration, intradermal administration, oral administration, topical administration, and intranasal administration, but is not limited thereto.

As used herein, the term "subject" refers to any animal, including humans, monkeys, cattle, horses, sheep, pigs, chickens, turkeys, quails, cats, dogs, mice, rats, rabbits, or guinea pigs having cancer or at risk of having cancer. As long as the disease can be effectively prevented or treated by administering the pharmaceutical composition of the present invention into a subject, any type of subject may be included without limitation.

Even another aspect of the present invention provides a method for treating cancer, including administering the cell therapy composition or the pharmaceutical composition to a subject except a human.

The terms used herein are the same as described above.

Still further another aspect of the present invention provides a reprogramming medium kit for directly producing iNKT cells, including: a) a first container containing a first medium including growth factors, cytokines, and a GSK3β inhibitor; and b) a second container containing a second medium including (1) growth factors, cytokines, and an AHR agonist, or (2) growth factors, cytokines, and an anti-CD3 antibody.

The terms used herein are the same as described above.

The kit of the present invention means a tool that can be used as a reprogramming medium for directly producing iNKT cells, including a first container containing the first medium and a second container containing the second medium. The type of the kit is not particularly limited, and a kit of a type commonly used in the art may be used.

The kit of the present invention may be packaged in a form in which the first medium and the second medium are each contained in individual containers, or in a form contained in one container which is divided into one or more compartments. The first medium and the second medium may each be packaged in a unit dose form for single administration.

The first medium and the second medium in the kit may be sequentially administered at appropriate times according to the experimental plan by those skilled in the art.

The kit of the present invention may further include an instruction manual describing the amount of each of the first medium and the second medium, the method of addition, the frequency of addition, etc.

The present invention provides a simplified production process because NKT cells are produced from isolated cells through direct reprogramming and a production time of at least 18 to 22 days, which is shorter than that obtained by the method in which the NKT cells were produced using conventional reprogramming techniques, thereby reducing costs, has excellent NKT cell production efficiency of 94.1% at maximum (efficiency of 33.1% when the CAR gene is further introduced), and ensures safety as the cells are produced without passing through pluripotent stem cells, thereby showing an excellent NKT cell production effect that is distinguished from that of the conventional reprogramming techniques.

In addition, the present invention is distinguished from the conventional method of obtaining NKT cells through direct harvesting, stem cell differentiation, etc. in that NKT cells can be directly produced by culturing cells, which have a different cell lineage from NKT cells and are easy to collect, in a reprogramming medium, and thus, the present invention is meaningful in that it can provide a wide range of options for cell types and quality.

Further, the iNKT cells produced according to the method of the present invention have an excellent cancer cell killing ability as described above, and thus can be provided as a cell therapy composition and a pharmaceutical composition for preventing or treating cancer including the same.

MODE FOR CARRYING OUT THE INVENTION

Hereinafter, the constitution and effect of the present invention will be described by way of specific Examples. However, these Examples are provided for illustrative purposes only, and the scope of the invention is not intended to be limited by these Examples.

Example 1: Direct Reprogramming of NKT Cells from PBMC

Isolated peripheral blood mononuclear cells (PBMC) were cultured for 4 days in a culture solution, while changing the medium once every 2 days.

In order to transform the reprogramming factors (Oct4, Sox2, Klf4, and Myc) into the PBMC, the Sendai virus system [Oct4, Sox2, Klf4, and Myc-expressing RNA-based Sendai virus (CytoTune 2.0 Sendai Reprogramming Kit, Thermo Scientific); OSKM-SeV] expressing the reprogramming factors were used. Specifically, in order to transform PBMC with the reprogramming factors, the cells were cultured in a standard culture medium (SCM medium) containing the Sendai virus (5 MOI), PBMC, and polybrene (4 μg/mL) for 1 day, and then the medium was replaced with a fresh medium. The next day, the transformed cells were dispended at a density of $2\times10^5$ cells into a 48-well plate and cultured in the first iNKT medium (StemSpan SFEM II containing 10% FBS, 1% penicillin/streptomycin, 100 ng/mL human SCF, 100 ng/mL human FLT3, 20 ng/mL human IL-3, 20 ng/mL human IL-6, and 5 μM CHIR99021) for 5 days, and then cultured in the iNKT second medium (StemSpan SFEM II containing 10% FBS, 1% penicillin/streptomycin, 20 ng/mL human SCF, 20 ng/mL human FLT3, 200 IU/mL human IL-2, 20 ng/mL human IL-7, 20 ng/mL human IL-15, 2 μM FICZ (6-formylindolo[3,2-b]carbazole), and 20 μg/mL biochanin A) including the AHR (aryl hydrocarbon receptor) agonist or the iNKT second medium (StemSpan SFEM II containing 10% FBS, 1% penicillin/streptomycin, 20 ng/mL human SCF, 20 ng/mL human FLT3, 200 IU/mL human IL-2, 20 ng/mL human IL-7, 20 ng/mL human IL-15, 10 ng/mL OKT3, and 10 ng/mL UCHT1) including the anti-CD3 antibody for 12 to 35 days to induce the cells into NKT cells (FIG. 1A).

In order to confirm whether NKT cells were prepared through the direct reprogramming, the cells were stained with the CD56 antibody and CD3 antibody, and then NKT cell groups (CD56+ and CD3+) were analyzed using flow cytometry. Specifically, NKT (iNKT) cells induced through direct reprogramming were added to a phosphate buffer (FACS buffer) containing 1% BSA (bovine serum albumin)

and 2 mM EDTA (ethylenediaminetetraacetic acid), supplemented with fluorescent-labeled antibodies against CD56 and CD3ζ, and reacted at room temperature for 20 minutes, and subsequently, the cells were washed and recovered using a centrifuge, and then analyzed by FACS (BD Bioscience).

As a result, it was confirmed that CD56+CD3+ NKT cells were produced with an efficiency of about 62% through direct reprogramming from PBMC (FIG. 1B).

Example 2: Direct Reprogramming of NKT Cells from T Cell Subtypes

In order to analyze the NKT production efficiency of T cell subtypes constituting PBMC, PBMCs were sorted into CD3+CD8−, CD3+CD8+, CD3−CD8−, CD3−CD8+ cell groups using FACSAriaII (BD), and then subjected to direct reprogramming according to the method of Example 1. On the 24th day after direct reprogramming, FACS analysis was performed according to the method of Example 1, and as a result, it was confirmed that CD56+CD3+ NKT cells were produced with an efficiency of about 94.1% through direct reprogramming from CD3+ CD8− cells (FIG. 2).

Based on the results of Examples 1 and 2, it was confirmed that NKT cells were directly produced from isolated somatic cells by direct reprogramming according to the introduction of reprogramming factors.

Example 3: Optimization of Reprogramming Medium 3-1. Optimization of Composition of iNKT First Medium and Second Medium The NKT production efficiency according to the addition of CHIR99021 (CT), SR1 (SR), and FICZ was confirmed in the composition of the iNKT first medium and the second medium of Example 1. Specifically, as shown in the table of FIG. 3, media A to F were prepared with or without addition of CHIR99021 (CT) and SR1 (SR) within the iNKT first medium and second medium. For media C and F, FICZ, an AHR agonist, was added instead of SR1 (SR). PBMCs were directly reprogrammed by the method of Example 1 using the iNKT first medium and second medium prepared with different medium compositions, and the NKT cell production efficiency was analyzed.

As a result, as shown in FIG. 3, it was confirmed that an excellent iNKT production efficiency of 40.5% was observed in medium C, in which CHIR99021 (CT) was added only to the iNKT first medium and FICZ was added to the iNKT second medium.

3-2: NKT Production Efficiency According to Addition of AHR Agonist or Anti-CD3 Antibody to iNKT Second Medium The NKT production efficiency was confirmed when FICZ or biochanin A, an AHR agonist, and OKT3 or UCHT1, an anti-CD3 antibody, were added in the composition of the iNKT second medium of Example 1.

Specifically, when the AHR agonist or anti-CD3 antibody was added to the iNKT second medium, the NKT production efficiency was increased by 3.7 to 4.7 times or more, as compared to when not added (10.0% when not added→42.9% when FICZ was added, 39.6% when biochanin A was added, 47.7% when OKT3 was added, and 36.9% when UCHT1 was added) (FIG. 4).

The results of the above Example confirmed that the AHR agonist or anti-CD3 antibody can be effectively used to enhance the NKT production yield in the step of direct reprogramming into NKT cells.

Example 4: Quantitative Analysis of CD107a+ Cells

In order to verify the cancer cell killing potential of the iNKT cells produced in Example 1, the frequency of CD107a+ cells having a cancer cell lysis ability, which are expressed after co-culturing iNKT cells with cancer cells, was quantitatively analyzed. Specifically, $1\times10^6$ cells/mL of HCT116 (human colon cancer cells), NIC-H460 (human lung cancer cells), HepG2 (human liver hepatocellular carcinoma cells), Mia-paca-2 (human pancreas ductal adenocarcinoma cells), which are cancer cells, and $1\times10^6$ cells/mL of iNKT cells were each dispensed in a 6-well plate in an amount of 1 mL, and centrifuged at 400 g for 1 minute, followed by culturing in a cell incubator at 37° C. in the presence of 5% CO2 for 2 hours or 16 hours, and then the frequency of CD107a+ cells was confirmed through flow cytometry. Specifically, the frequency of CD107a+ cells was analyzed by gating the CD56+CD3+ cell group through FACS analysis, after reacting the iNKT cells in FACS buffer supplemented with fluorescent-labeled CD56-PE, CD3-APC, and CD107a-FITC antibodies at room temperature for 20 minutes.

As a result, it was confirmed that the frequency (%) of CD107a+ cells was increased in the co-cultured iNKT cells, compared to the control group without co-cultivation (FIG. 5).

Example 5: Measurement of Cancer Cell Killing Ability of iNKT Cells

In order to measure the cancer cell killing ability of the iNKT cells produced in Example 1, the cell killing ability was measured using calcein-AM. Specifically, Raji (Raji B, human B lymphocyte; Burkitt's lymphoma), SNU-817 (human B-lymphoblastoid cells), K562 (human immortalised myelogenous leukemia cells), HCT116, PC3 (human prostate cancer cells), HepG2, NIC-H460, and Mia-paca-2, which are cancer cells, were diluted to $1\times10^5$ cells/mL in DMEM medium containing 10% fetal bovine serum, added with calcein-AM to a concentration of 25 μM, and washed with DMEM medium after culturing for 1 hour at 37° C., and accordingly, calcein-labeled target cancer cells were prepared.

The iNKT cells were prepared by diluting the cells to a density of $0.25\times10^5$ cells/mL, $1\times10^5$ cells/mL, and $2.5\times10^5$ cells/mL using a culture solution, and then dispensed in a 96-well plate in an amount of 100 mL. The thus-prepared calcein-labeled target cancer cells ($1\times10^5$ cells/mL) were added to a 96-well plate in an amount of 100 μL/well, centrifuged at 400 g for 1 minute, and then cultured in a cell incubator at 37° C. for 4 hours in the presence of 5% CO2, and subsequently, 100 μL of the supernatant was taken from each well and measured with a fluorescence plater reader (485 nm/535 nm). The cell killing ability (%) was calculated according to the following formula.

Cancer Cell Killing Ability (%)={(Measured Value−Minimum Value)/(Measured Value−Minimum Value)}×100

In the above formula, the minimum value is the measured value of a well in which only calcein-labeled target cancer cells exist, and the maximum value is the measured value of a well in which cells are completely lysed by adding 0.1% TritonX-100 to the calcein-labeled target cancer cells.

As a result, it was confirmed that the iNKT cells exhibited a high cell killing ability against cancer cells, and that the cancer cell killing ability was increased in proportion to the number of iNKT cells (FIG. 6).

Example 6: Verification of In Vivo Cancer Cell Killing Ability of iNKT Cells 5 mL (2×10⁶ cells/mL) of CFPAC-1 expressing luciferase were subcutaneously injected into the back of 8-week-old nude mice (Balb/c-nude mice, average weight 20-25 g) to prepare a pancreatic cancer cell xenograft mouse animal model. The next day, after injecting 200 μL of PBS as a negative control, or iNKT cells as an experimental group (1×10⁷ cells/200 μL PBS), the tumor size was confirmed through IVIS 100 (PerkinElmer) at 7-day intervals.

As a result, it was confirmed that the tumor size formed in the iNKT experimental group (8.01×10⁹ radiance) was significantly reduced compared to the tumor size (1.21×10¹⁰ radiance) formed in the control group on the 14th day after PBS or iNKT injection (FIG. 7).

Example 7: Construction of Double Cistron Lentiviral Vectors Encoding CAR

In order to construct double cistron lentiviral vectors encoding CAR (chimeric antigen receptor), four CAR genes each binding to CD19, HER2 (human epidermal growth factor receptor 2), or MSLN (mesothelin) were constructed. Each of the above CAR genes was constructed to include genes encoding an extracellular domain, a transmembrane domain, and an intracellular domain including an antibody domain (scFv). Specifically, each of the CAR genes was constructed as follows (FIG. 8):

i) CD19-CAR1 gene including CD8 leader (SEQ ID NO: 1), CD19 scFv (SEQ ID NO: 2), CD8 hinge (SEQ ID NO: 5), CD8 transmembrane (TM) domain (SEQ ID NO: 6), Fc-γ (gamma) receptor (SEQ ID NO: 7), and GFP (green fluorescent protein) (SEQ ID NO: 11);

ii) CD19-CAR2 gene including CD8 leader (SEQ ID NO: 1), CD19 scFv (SEQ ID NO: 2), CD8 hinge (SEQ ID NO: 5), CD8 transmembrane domain (SEQ ID NO: 6), CD28 intracellular domain (SEQ ID NO: 8), CD3 (zeta) (SEQ ID NO: 9), IRES (internal ribosome entry site) (SEQ ID NO: 10), and GFP (SEQ ID NO: 11);

iii) MSLN-CAR gene including CD8 leader (SEQ ID NO: 1), MSLN (mesothelin) scFv (SEQ ID NO: 3), CD8 hinge (SEQ ID NO: 5), CD8 transmembrane domain (SEQ ID NO: 6), CD28 intracellular domain (SEQ ID NO: 8), CD3 (SEQ ID NO: 9), IRES (SEQ ID NO: 10), and GFP (SEQ ID NO: 11); and iv) HER2-CAR gene including CD8 leader (SEQ ID NO: 1), HER2 (human epidermal growth factor receptor 2) scFv (SEQ ID NO: 4), CD8 hinge (SEQ ID NO: 5), CD8 transmembrane domain (SEQ ID NO: 6), CD28 intracellular domain (SEQ ID NO: 8), CD3 (SEQ ID NO: 9), IRES (SEQ ID NO: 10), and GFP (SEQ ID NO: 11).

The IRES was inserted for cloning the CAR gene into a vector constituting a double cistron. For each vector containing the four CAR genes, each domain of FIG. 8 was synthesized from CAR1 (Addgene ID: 113014), and CAR-expressing lentiviruses were constructed through overlap PCR (Gibson assembly).

Example 8: Production of CAR-iNKT Using Direct Reprogramming from PBMC to NKT Cells PBMCs were cultured for 4 days in the culture solution (Stempro SFEM II containing 2.5% StemPro-34 nutrient supplement, 2 mM Glutamax I, 1% penicillin/streptomycin, 20 ng/mL human IL-3, 20 ng/mL human IL-6, 100 ng/mL human stem cell factor (SCF), and 100 ng/mL human FLT3 (FMS-like tyrosine kinase)), while changing the medium once every 2 days.

In order to transform the reprogramming factors (Oct4, Sox2, Klf4, and Myc) into the PBMC, the Sendai virus system [Oct4, Sox2, Klf4, and Myc-expressing RNA-based Sendai virus (CytoTune 2.0 Sendai Reprogramming Kit, Thermo Scientific); OSKM-SeV] expressing the reprogramming factors and the 4 types of lentiviruses expressing the 4 types of CARs of Example 7 were used. Specifically, in order to transform PBMC with the reprogramming factors, the cells were cultured in a standard culture medium (SCM medium) containing the Sendai virus (5 MOI), PBMC, and polybrene (4 μg/mL) for 1 day, and then the medium was replaced with a fresh medium. The next day, the transformed cells (2×10⁵ cells/48-well plate) were cultured in the first iNKT medium for 5 to 6 days, and then cultured in the iNKT second medium including the anti-CD3 antibody or the iNKT second medium including the AHR agonist for 12 to 35 days to induce the cells into NKT cells, and subsequently, the cells were added with lentiviruses (2 MOI) expressing CD19-CAR1 gene, CD19-CAR2 gene, MSLN-CAR gene, or HER2-CAR gene and polybrene (4 μg/mL) and further cultured for 4 to 28 days so that the CAR gene was transformed into the induced NKT cells (FIG. 9). The CAR-expressing lentiviruses were inoculated into a culture medium selected from the step of culturing in the iNKT first medium or the iNKT second medium simultaneously with the reprogramming factor (day 0) or after introduction of the reprogramming factor, as shown in FIG. 9, and thus were transformed into the cells during the reprograming process by which PBMC were converted into NKT cells.

In order to confirm whether iNKT cells introduced with the CD19-CAR1 gene, CD19-CAR2 gene, MSLN-CAR gene, or HER2-CAR gene were prepared through the direct reprogramming, the cells were stained with the CD56 antibody, CD3 antibody, CD19 antigen, MSLN antigen, and HER2 antigen, and then CD56+CD3+CD19-CAR-iNKT cell group, CD56+CD3+ MSLN-CAR-iNKT cell group, and CD56+CD3+ HER2-CAR-iNKT cell group were analyzed using flow cytometry. Specifically, in the case of iNKT cells (CD19-CAR-iNKT cells) into which the CD19-CAR1 gene was introduced, FACS analysis was performed in the same manner as in Example 1. In the case of iNKT cells (MSLN-CAR-iNKT cells) into which the MSLN-CAR gene was introduced, or iNKT cells (HER2-CAR-iNKT cells) into which HER2-CAR gene was introduced, the cells were primarily reacted in FACS buffer supplemented with CD3-PE (BD Bioscience), and MSLN antigen-biotin or HER2 antigen-biotin at room temperature for 20 minutes, and subsequently, the cells were washed and recovered using a centrifuge.

As a result, it was confirmed that CD56+CD3+CD19-CAR-iNKT cells were produced with an efficiency of 20.3% (FIG. 10), that CD56+CD3+ MSLN-CAR-iNKT cells were produced with an efficiency of 28.8% (FIG. 11), and that CD56+CD3+ HER2-CAR-iNKT cells were produced with an efficiency of 33.1% (FIG. 12).

Example 9: Measurement of Cancer Cell Killing Ability of iNKT Cells into which CD19-CAR2 was Introduced The iNKT cells of Example 1 and the iNKT cells (CD19-CAR2-iNKT cells) introduced with the CD19-CAR2 of Example 8 were diluted with a culture solution to a cell number density of 0.25×10⁵ cells/mL or 1×10⁵ cells/mL, respectively, and then dispensed in a 96-well plate in an amount of 100 μL. Calcein-labeled target cancer cells were prepared using Raji (Raji B) and SNU-817, which are cancer cells, according to the method of Example 5. After adding 1×10⁵ cells/mL of the calcein-labeled target cancer cells to a 96-well plate in an amount of 100 μL/well, the cancer cell killing ability was measured according to the method of Example 5.

As a result, it was confirmed that CD19-CAR2-iNKT cells exhibited higher killing ability against target cancer cells than the control iNKT cells (FIG. 13).

Example 10: Measurement of Cancer Cell Killing Ability of iNKT Cells into which MSLN-CAR or HER2-CAR was Introduced The iNKT cells of Example 1, iNKT cells into which MSLN-CAR of Example 8 was introduced (MSLN-CAR-iNKT cells), and iNKT cells into which HER2-CAR of Example 8 was introduced (HER2-CAR-iNKT cells) were diluted with a culture solution to a cell number density of 0.25×10⁵ cells/mL or 1×10⁵ cells/mL, respectively, and then dispensed in a 96-well plate in an amount of 100 μL. Calcein-labeled target cancer cells were prepared using PC3(PC-3), CFPAC-1, and HepG2, which are cancer cells, according to the method of Example 5. After adding 1×10⁵ cells/mL of the calcein-labeled target cancer cells to a 96-well plate in an amount of 100 μL/well, the cancer cell killing ability was measured according to the method of Example 5.

As a result, it was confirmed that MSLN-CAR-iNKT cells or HER2-CAR-iNKT cells exhibited higher killing ability against target cancer cells than the control iNKT cells (FIGS. 14 and 15).

From the results of the above Examples, it was confirmed that the isolated cells could be induced into NKT cells exhibiting anticancer activity using direct reprogramming, and also that NKT cells introduced with the CAR genes having superior anticancer activity could be produced by introducing the CAR genes during direct reprogramming.

Those of ordinary skill in the art will recognize that the present invention may be embodied in other specific forms without departing from its spirit or essential characteristics. The described embodiments are to be considered in all respects only as illustrative and not restrictive. The scope of the present invention is therefore indicated by the appended claims rather than by the foregoing description. All changes which come within the meaning and range of equivalency of the claims are to be embraced within the scope of the present invention.

The invention claimed is:

1. A method for producing iNKT (induced natural killer T) cells, comprising: culturing isolated cells introduced with I) a reprogramming factor or II) a reprogramming factor and a CAR (chimeric antigen receptor) gene sequentially in a) a first medium containing SCF (Stem Cell Factor), FLT3L (FMS-related Tyrosine Kinase-3 Ligand), IL(Interleukin)-3, IL-6, and CHIR99021; and b) a second medium containing (1) SCF, FLT3L, IL-2, IL-7, IL-15, FICZ and biochanin A, or (2) SCF, FLT3L, IL-2, IL-7, IL-15, and UCHT1, and thereby directly reprogramming into NKT cells without passing through pluripotent stem cells.

2. The method of claim 1, wherein the first medium of a) or the second medium of b) further contains any one or more selected from the group consisting of FBS (fetal bovine serum), antibiotics, and a combination thereof.

3. The method of claim 1, wherein the isolated cells introduced with a reprogramming factor are cultured in the first medium of a) for 4 to 8 days, and then cultured in the second medium of b) for 12 days or more.

4. The method of claim 1, wherein the reprogramming factor is any one or more selected from the group consisting of Lin28, Asc11, Pitx3, Nurr1, Lmx1a, Nanog, Oct4, Oct3, Sox2, Klf4, Myc, and a combination thereof.

5. The method of claim 4, wherein the reprogramming factor is Oct4, Sox2, Klf4, and Myc.

6. The method of claim 1, wherein the isolated cells introduced with a reprogramming factor are somatic cells except NKT cells.

7. The method of claim 1, wherein the CAR gene is introduced into the isolated cells during any one selected from the culturing in the first medium of a), or in the second medium of b), when introducing the reprogramming factor.

8. The method of claim 1, wherein the CAR gene is any one or more selected from the group consisting of:
i) a CAR gene comprising CD8 leader, CD19 scFv, CD8 hinge, CD8 transmembrane domain, and an Fc-γ receptor;
ii) a CAR gene comprising CD8 leader, CD19 scFv, CD8 hinge, CD8 transmembrane domain, CD28 intracellular domain, CD3ζ, and IRES (internal ribosome entry site);
iii) a CAR gene comprising CD8 leader, MSLN (mesothelin) scFv, CD8 hinge, CD8 transmembrane domain, CD28 intracellular domain, CD3ζ, and IRE; and
iv) a CAR gene comprising CD8 leader, HER2 (human epidermal growth factor receptor 2) scFv, CD8 hinge, CD8 transmembrane domain, CD28 intracellular domain, CD3ζ, and IRES.

9. The method of claim 8, wherein the CAR gene further comprises GFP (green fluorescent protein).

10. The method of claim 1, wherein the iNKT cells produced above express any one or more selected from the group consisting of CD56+, CD3+, and a combination thereof.

11. A composition for preventing or treating cancer, comprising the iNKT cells produced according to the method of claim 1, as an active ingredient.

12. A reprogramming medium kit for directly producing iNKT cells, comprising: a) a first container containing a first medium including SCF, FLT3L, IL-3, IL-6, and CHIR99021; and b) a second container containing a second medium including (1) SCF, FLT3L, IL-2, IL-7, IL-7, IL-15, FICZ and biochanin A, or (2) SCF, FLT3L, IL-2, IL-7, IL-15, OKT3 and UCHT1.

\* \* \* \* \*